(12) United States Patent
Guo et al.

(10) Patent No.: US 12,195,593 B2
(45) Date of Patent: Jan. 14, 2025

(54) SOLVENTLESS POLYORGANOSILOXANE PELLETS AND PROCESSES FOR THE PREPARATION AND USE THEREOF

(71) Applicants: Dow Silicones Corporation, Midland, MI (US); Dow Global Technologies LLC, Midland, MI (US)

(72) Inventors: Yunlong Guo, Shanghai (CN); Rongrong Fan, Shanghai (CN); Ruihua Lu, Shanghai (CN); Wenfei Li, Shanghai (CN); Zhihua Liu, Shanghai (CN); Wenjie Chen, Shanghai (CN); Yan Zhou, Shanghai (CN); Jiayin Zhu, Shanghai (CN)

(73) Assignees: Dow Silicones Corporation, Midland, MI (US); Dow Global Technologies LLC, Midland, MI (US)

( * ) Notice: Subject to any disclaimer, the term of this patent is extended or adjusted under 35 U.S.C. 154(b) by 27 days.

(21) Appl. No.: 17/635,723

(22) PCT Filed: Oct. 30, 2019

(86) PCT No.: PCT/CN2019/114422
§ 371 (c)(1),
(2) Date: Feb. 16, 2022

(87) PCT Pub. No.: WO2021/081822
PCT Pub. Date: May 6, 2021

(65) Prior Publication Data
US 2024/0026084 A1 Jan. 25, 2024

(51) Int. Cl.
*C09J 183/04* (2006.01)
*B29B 9/06* (2006.01)
(Continued)

(52) U.S. Cl.
CPC .............. *C08G 77/04* (2013.01); *C08J 3/005* (2013.01); *C08L 83/04* (2013.01); *C09J 11/08* (2013.01);
(Continued)

(58) Field of Classification Search
CPC .......... C08G 77/04; C08G 77/70; C08J 3/005; C08L 83/04; C09J 183/02; C09J 183/04
See application file for complete search history.

(56) References Cited

U.S. PATENT DOCUMENTS 2,676,182 A   4/1954  Daudt et al.
3,445,420 A   5/1969  Kookootsedes et al.
(Continued)

FOREIGN PATENT DOCUMENTS

CN   101177596 A   5/2008
EP   0556023       8/1993
(Continued)

OTHER PUBLICATIONS

Search Report from corresponding European Application No. EP19951053 dated Jul. 4, 2023.
(Continued)

*Primary Examiner* — Alison L Hindenlang
*Assistant Examiner* — Keran V Nguyen
(74) *Attorney, Agent, or Firm* — Catherine U. Brown

(57) ABSTRACT

A method for making a solventless polyorganosiloxane pellet is disclosed. The pellet is comprised of a polyorganosilicate resin and a polyorganosiloxane gum. The pellet is useful for making silicone pressure sensitive adhesive compositions.

17 Claims, 3 Drawing Sheets

(51) Int. Cl.
*B29K 83/00* (2006.01)
*C08G 77/04* (2006.01)
*C08J 3/00* (2006.01)
*C08L 83/04* (2006.01)
*C09J 11/08* (2006.01)
*C08G 77/00* (2006.01)

(52) U.S. Cl.
CPC ............... *C09J 183/04* (2013.01); *B29B 9/06* (2013.01); *B29K 2083/00* (2013.01); *C08G 77/70* (2013.01); *C08J 2383/04* (2013.01); *C08J 2483/07* (2013.01); *C09J 2301/302* (2020.08)

(56) References Cited

U.S. PATENT DOCUMENTS

| | | |
|---|---|---|
| 3,989,667 A | 11/1976 | Lee et al. |
| 4,584,355 A | 4/1986 | Blizzard et al. |
| 4,585,836 A | 4/1986 | Homan et al. |
| 4,591,622 A | 5/1986 | Blizzard et al. |
| 4,611,042 A | 9/1986 | Rivers-Farrell et al. |
| 4,774,310 A | 9/1988 | Butler et al. |
| 5,292,586 A | 3/1994 | Lin et al. |
| 5,708,098 A | 1/1998 | Cook et al. |
| 5,844,031 A | 12/1998 | Chen et al. |
| 5,861,450 A | 1/1999 | Chen et al. |
| 6,387,487 B1 | 5/2002 | Greenberg et al. |
| 6,677,407 B1 | 1/2004 | Bilgrien et al. |
| 6,806,339 B2 | 10/2004 | Cray et al. |
| 7,728,080 B2 | 6/2010 | Aoki et al. |
| 8,017,712 B2 | 9/2011 | Berry et al. |
| 9,562,149 B2 | 2/2017 | Cray et al. |
| 9,593,209 B2 | 3/2017 | Dent et al. |
| 2003/0065086 A1 | 4/2003 | Kosal |
| 2003/0088042 A1 | 5/2003 | Griswold et al. |
| 2004/0254274 A1 | 12/2004 | Griswold et al. |
| 2005/0038188 A1 | 2/2005 | Ahn et al. |
| 2007/0289495 A1 | 12/2007 | Cray et al. |
| 2012/0328863 A1 | 12/2012 | Kuo et al. |
| 2016/0053148 A1 | 2/2016 | Tsuchida et al. |
| 2017/0233612 A1 | 8/2017 | Han et al. |
| 2018/0044566 A1* | 2/2018 | Brown .................. C09J 183/08 |
| 2018/0105692 A1 | 4/2018 | Imaizumi et al. |

FOREIGN PATENT DOCUMENTS

| | | |
|---|---|---|
| EP | 826719 A2 | 3/1998 |
| EP | 1810995 A1 | 7/2007 |
| EP | 2164901 B1 | 11/2018 |
| EP | 3650515 A1 | 5/2020 |
| JP | 03516410 B2 | 4/2004 |
| JP | 04761049 B2 | 8/2011 |
| TW | 370550 | 9/1999 |
| WO | 9634028 A1 | 10/1996 |
| WO | 9634029 A1 | 10/1996 |
| WO | 2009002668 A2 | 12/2008 |
| WO | 2009002681 A1 | 12/2008 |
| WO | 2012094885 | 7/2012 |
| WO | 2019043491 | 3/2019 |
| WO | WO-2019043491 A1 * | 3/2019 .............. C08L 83/04 |
| WO | 2020000389 | 1/2020 |

OTHER PUBLICATIONS

Office Action Report Letter from corresponding Japanese Application No. 2022-523626 dated Sep. 22, 2023.

* cited by examiner

Figure 2
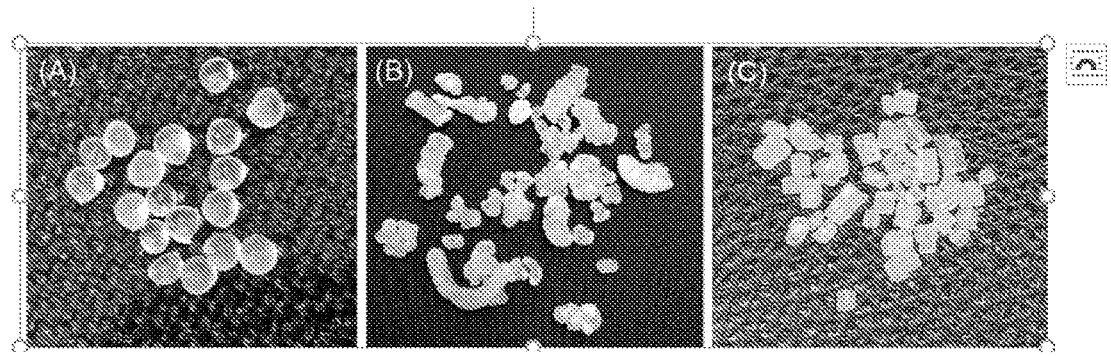
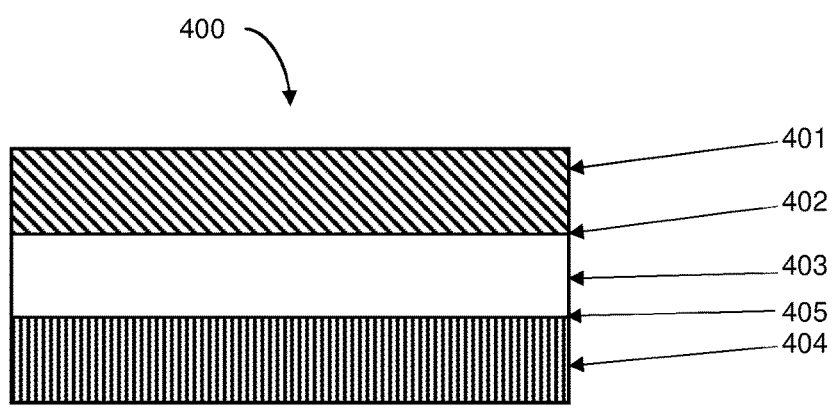
Figure 3

US 12,195,593 B2

SOLVENTLESS POLYORGANOSILOXANE PELLETS AND PROCESSES FOR THE PREPARATION AND USE THEREOF

CROSS REFERENCE TO RELATED APPLICATIONS

This application is a U.S. national stage filing under 35 U.S.C. § 371 of PCT Application No. PCT/CN2019/114422 filed on 30 Oct. 2019, currently pending. PCT Application No. PCT/CN2019/114422 is hereby incorporated by reference.

TECHNICAL FIELD

A solventless polyorganosiloxane pellet and a method for its preparation are disclosed. The pellet is comprised of a polyorganosilicate resin and a polyorganosiloxane gum. The pellet is useful as a starting material for making curable silicone pressure sensitive adhesive compositions.

BACKGROUND

Polyorganosilicate resin is typically produced in an aromatic solvent because the resin is solid at room temperature (RT). Without solvent, the resin typically has a powder or flake form, which has very low bulk density and may be difficult to store and ship. Powders can be inconvenient to handle and convey in manufacturing processes for silicone compositions such as silicone curable pressure sensitive adhesive compositions. And, flake resin typically has high glass transition temperature and high melting temperature, which make it difficult to blend with other ingredients homogeneously, especially with polyorganosiloxane gums, when preparing silicone compositions.

Pellets are a widely used delivery form for starting materials in the plastics industry. A densely packed pellet can be easily stored, shipped and conveyed by general machines like belt or screw feeders. However, use of pellets has been limited in the silicones industry.

Attempts to manufacture pellets including siloxane resins and polydiorganosiloxane polymers in the past have included dissolving the resin in solvent or combining the resin and polymer in a solvent, and thereafter removing the solvent. The resulting combination inherently contains residual solvent.

Problems to be Solved

Therefore, there is a need in the silicones industry, particularly the silicone pressure sensitive adhesives industry, for a pelletized form of polyorganosilicate resin, which is easy to ship and store, both for manufacturing process efficiency and for mixing efficiency when combining the polyorganosilicate resin with other starting materials for products such as silicone curable pressure sensitive adhesive compositions. A process to manufacture such a pellet is desired.

Furthermore, there is a need in the silicones industry to produce silicone pressure sensitive adhesives that have a desired resin/gum ratio and/or that are solventless i.e., where residual aromatic solvent in the silicone curable pressure sensitive adhesive composition product is none or non-detectable to ≤100 ppm.

SUMMARY

A solventless polyorganosiloxane pellet comprises a polydiorganosiloxane gum and a polyorganosilicate resin. A process for preparing the solventless polyorganosiloxane pellet comprises adding the gum before the resin. The solventless polyorganosiloxane pellet is useful in preparing silicone pressure sensitive adhesives.

BRIEF DESCRIPTION OF THE DRAWINGS

FIG. 2 shows pellets made according to the Examples section herein. FIG. 2(A) shows pellets made according to Example 1, below. FIG. 2(B) shows pellets made according to Comparative Example 2, below. FIG. 2(C) shows pellets made according to Example 3, below.

FIG. 3 shows a partial cross section of an adhesive article 400. The adhesive article comprises a pressure sensitive adhesive 401 prepared by curing a pressure sensitive adhesive composition described herein on a first surface 402 of a film substrate 103. The article 400 further includes a second substrate 404 mounted to an opposing surface 405 of the film substrate 403.

DETAILED DESCRIPTION

Figure 1A:
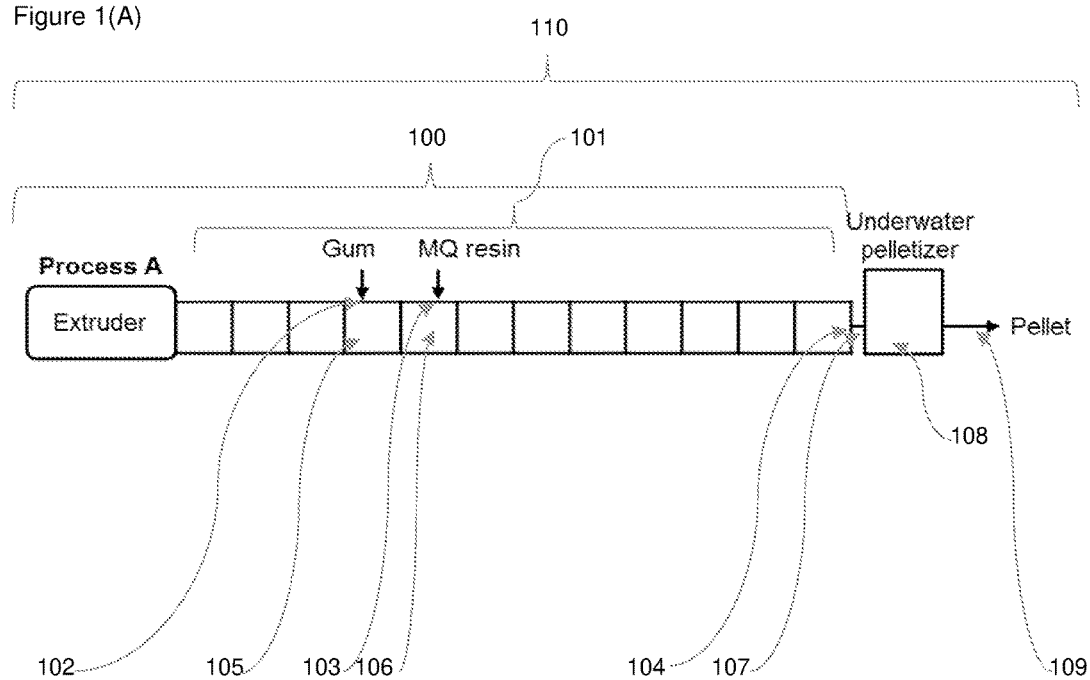
FIG. 1(A) shows a schematic diagram of an apparatus suitable for preparing pellets according to this invention.

The solventless polyorganosiloxane pellet (Pellet) comprises a polydiorganosiloxane gum (Gum) and a polyorganosilicate resin (Resin). Alternatively, the Pellet may consist essentially of Gum and Resin. Alternatively, the Pellet may consist of Gum and Resin. The amounts Gum and Resin in the Pellet are sufficient to provide a weight ratio of Resin:Gum (R:G ratio) of 2.1:1 to 3.5:1. Alternatively, the R:G ratio may be 2.4:1 to 3.0:1, alternatively 2.4:1 to 2.9:1, alternatively 2.7:1 to 2.9:1, and alternatively 2.4:1 to 2.5:1.

Gum

The Gum in the Pellet may be a polydiorganosiloxane gum terminated with an aliphatically unsaturated group or a hydroxyl group. The Gum has number average molecular weight (Mn)≤500,000 g/mol, alternatively 500,000 g/mol to 1,000,000 g/mol, and alternatively 600,000 g/mol to 800,000 g/mol as measured by GPC according to the test method in Reference Example 1 of U.S. Pat. No. 9,593,209 beginning at col. 31.

The Gum may have unit formula (G-1): $(R^3R^2_2SiO_{1/2})_a(R^2_2SiO_{2/2})_b(R^2SiO_{3/2})_c$, where each $R^2$ is independently selected from the group consisting of an alkyl group of 1 to 18 carbon atoms and an aryl group of 6 to 18 carbon atoms, and each $R^3$ is a curable group, subscript a≤2, subscript b>5000, and subscript c≤0, with the proviso that a quantity (a+b+c) is sufficient to give the Gum the Mn described above. Alternatively, subscript a may be 2. Alternatively, subscript b may be 5300 to 6000; alternatively 5400 to 5900. Alternatively, subscript c may be 0.

In unit formula (G-1), $R^2$ may be an alkyl group of 1 to 18 carbon atoms. Alternatively, each $R^2$ may have 1 to 12 carbon atoms, and alternatively 1 to 6 carbon atoms. "Alkyl" means a cyclic, branched, or unbranched, saturated monovalent hydrocarbon group. Alkyl is exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl, and branched alkyl groups of 6 or more carbon atoms; and cyclic alkyl groups such as cyclopentyl and cyclohexyl. Alternatively, one or more instances of $R^2$ may be an aryl group. "Aryl" means a cyclic, fully unsaturated, hydrocarbon group. Aryl is exemplified by, but not limited to, cyclopentadienyl, phenyl, anthracenyl, and naphthyl. Monocyclic aryl groups may have 5 to 9 carbon atoms, alternatively 6 to 7 carbon atoms, and alternatively 5 to 6 carbon atoms. Polycyclic aryl groups may have 10 to 17 carbon atoms, alternatively 10 to 14 carbon atoms, and alternatively 12 to 14 carbon atoms. Alternatively, each $R^2$ may be independently selected from methyl and phenyl. Alternatively, each $R^2$ may be alkyl. Alternatively, each $R^2$ may be methyl.

In unit formula (G-1), each $R^3$ is a curable group. Each $R^3$ may be independently selected from the group consisting of OH and a monovalent aliphatically unsaturated hydrocarbon group of 2 to 18 carbon atoms. Alternatively, the aliphatically unsaturated hydrocarbon group for $R^3$ may have 2 to 12 carbon atoms, and alternatively 2 to 6 carbon atoms. Suitable monovalent aliphatically unsaturated hydrocarbon groups include alkenyl groups and alkynyl groups. "Alkenyl" means a monovalent hydrocarbon group having one or more carbon-carbon double bonds. Alkenyl groups may be linear, branched or cyclic. Suitable alkenyl groups are exemplified by vinyl; allyl; propenyl (e.g., isopropenyl, and/or n-propenyl); and butenyl, pentenyl, hexenyl, and heptenyl, (also including branched isomers of 4 to 7 carbon atoms); and cyclohexenyl. "Alkynyl" means a monovalent hydrocarbon group having one or more carbon-carbon triple bonds. Alkynyl groups may be branched, unbranched, or cyclic. Suitable alkynyl groups are exemplified by ethynyl, propynyl, and butynyl (also including branched isomers of 2 to 4 carbon atoms). Alternatively, aliphatically unsaturated group for $R^3$ may be alkenyl, such as vinyl, allyl, or hexenyl.

Alternatively, each $R^2$ may be an alkyl group, each $R^3$ may be independently selected from the group consisting of OH and an alkenyl group of 2 to 18 carbon atoms, subscript a may be 2, subscript c may be 0, and subscript b may be 5300 to 6000. Alternatively, each $R^2$ may be methyl; each $R^3$ may be independently selected from the group consisting of OH, vinyl, allyl, and hexenyl; subscript a may be 2; subscript c may be 0; and subscript b may be is 5400 to 5900.

Alternatively, the Gum may be a bis-hydroxyl-terminated polydiorganosiloxane. The hydroxyl-functional polydiorganosiloxane may have unit formula (G-2): $[R^2{}_2(HO)SiO_{1/2}]_2(R^2{}_2SiO_{2/2})_d$, where each $R^2$ is as described above; subscript d≥0, subscript, with the proviso that subscript d has a value sufficient to give the Gum the Mn described above. Alternatively, the Gum may be a bis-alkenyl-terminated polydiorganosiloxane. The hydroxyl-functional polydiorganosiloxane may have unit formula (G-3): $(R^2{}_2R^{3'}SiO_{1/2})_2(R^2{}_2SiO_{2/2})_d$, where each $R^2$ is as described above; $R^{3'}$ is an alkenyl group as described above, and subscript d≥0, with the proviso that subscript d has a value sufficient to give the Gum the Mn described above. Alternatively, the Gum may be a combination of a bis-hydroxyl-terminated polydiorganosiloxane and a bis-alkenyl-terminated polydiorganosiloxane.

Gums are known in the art and may be prepared by methods such as hydrolysis and condensation of the corresponding organohalosilanes or equilibration of cyclic polydiorganosiloxanes. Gums are commercially available, for example, SILASTIC™ SGM-36 is commercially available from Dow Silicones Corporation of Midland, Michigan, USA. Examples of suitable Gums for use herein are exemplified by: i) dimethylvinylsiloxy-terminated polydimethylsiloxane, ii) dimethylvinylsiloxy-terminated poly(dimethylsiloxane/methylphenyl)siloxane, iii) dimethylvinylsiloxy-terminated poly(dimethylsiloxane/diphenyl)siloxane, iv) phenyl,methyl,vinyl-siloxy-terminated polydimethylsiloxane, v) dimethyl hexenylsiloxy-terminated polydimethylsiloxane, vi) di methylhexenyl-siloxy terminated poly(dimethylsiloxane/methylphenyl)siloxane, vii) dimethylhexenylsiloxy-terminated poly(dimethylsiloxane/diphenyl)siloxane, viii) hydroxyl-terminated polydimethylsiloxane, ix) hydroxyl-terminated poly(dimethylsiloxane/methylphenyl)siloxane, x) hydroxyl-terminated poly(dimethylsiloxane/diphenyl)siloxane, xi) a combination of two or more of i) to x). Alternatively, the Gum may be selected from the group consisting of i) dimethylvinylsiloxy-terminated polydimethylsiloxane, v) dimethylhexenylsiloxy-terminated polydimethylsiloxane, and a combination i) and v). Alternatively, the gum may be selected from the group consisting of viii), ix), and x). Alternatively, the Gum may be selected from the group consisting of i) and viii).

Polyorganosilicate Resin

The polyorganosilicate resin (Resin) comprises monofunctional units of formula $R^M{}_3SiO_{1/2}$ and tetrafunctional units ("Q" units) of formula $SiO_{4/2}$, where each $R^M$ is an independently selected monovalent hydrocarbon group. Suitable monovalent hydrocarbon groups for $R^M$ may have 1 to 20 carbon atoms, alternatively 1 to 12 carbon atoms, alternatively 1 to 8 carbon atoms, alternatively 1 to 4 carbon atoms, and alternatively 1 to 2 carbon atoms. Alternatively, the hydrocarbon groups for $R^M$ may be selected from the group consisting of alkyl groups, alkenyl groups, and aryl groups; alternatively alkyl and aryl; alternatively alkyl and alkenyl; and alternatively alkyl. The alkyl groups and aryl groups are as described above for $R^2$ and the alkenyl groups are as the alkenyl groups described above for $R^3$. Alternatively, in the Resin, each $R^M$ may be independently selected from the group consisting of alkyl, alkenyl, and aryl. Alternatively, each $R^M$ may be selected from methyl, vinyl and phenyl. Alternatively, at least one-third, alternatively at least two thirds of the $R^M$ groups are methyl groups. Alternatively, the monofunctional units may be exemplified by $(Me_3SiO_{1/2})$, $(Me_2PhSiO_{1/2})$, and $(Me_2ViSiO_{1/2})$. The Resin is soluble in solvents such as those described herein as starting material (H), exemplified by liquid hydrocarbons, such as benzene, toluene, xylene, and heptane, or in liquid organosilicon compounds such as low viscosity linear and cyclic polydiorganosiloxanes.

When prepared, the Resin comprises the monofunctional and tetrafunctional units described above, and the polyorganosiloxane further comprises units with silanol (silicon bonded hydroxyl) groups and may comprise neopentamer of formula $Si(OSiR^M{}_3)_4$, where $R^M$ is as described above. $Si^{29}$ Nuclear Magnetic Resonance (NMR) spectroscopy, as described in U.S. Pat. No. 9,593,209 at col. 32, Reference Example 2, may be used to measure molar ratio of M and Q units, where said ratio is expressed as {M(resin)+(M(neopentamer)}/{Q(resin)+Q(neopentamer)} and represents the molar ratio of the total number of triorganosiloxy groups (monofunctional units) of the resinous and neopentamer portions of the Polyorganosilicate Resin to the total number of silicate groups (Q units) in the resinous and neopentamer portions.

The Mn of the Resin depends on various factors including the types of hydrocarbyl groups represented by $R^M$ that are present. The Mn of the Resin refers to the number average molecular weight measured using GPC according to the procedure in U.S. Pat. No. 9,593,209 at col. 31, Reference Example 1, when the peak representing the neopentamer is excluded from the measurement. The Mn of the Resin may be greater than 2,000 g/mol, alternatively 2,500 g/mol to 8,000 g/mol. Alternatively, Mn of the Resin may be 2,900 g/mol to 5,000 g/mol.

The Resin can be prepared by any suitable method, such as cohydrolysis of the corresponding silanes or by silica hydrosol capping methods. The Resin may be prepared by silica hydrosol capping processes such as those disclosed in U.S. Pat. No. 2,676,182 to Daudt, et al.; U.S. Pat. No. 4,611,042 to Rivers-Farrell et al.; and U.S. Pat. No. 4,774,310 to Butler, et al. The method of Daudt, et al. described above involves reacting a silica hydrosol under acidic conditions with a hydrolyzable triorganosilane such as trimethylchlorosilane, a siloxane such as hexamethyldisiloxane, or mixtures thereof, and recovering a copolymer having monofunctional units and tetrafunctional units. The resulting copolymers generally contain from 2 to 5 percent by weight of hydroxyl groups.

The intermediates used to prepare the Resin may be triorganosilanes and silanes with four hydrolyzable substituents or alkali metal silicates. The triorganosilanes may have formula $R^M{}_3SiX^1$, where $R^M$ is as described above and $X^1$ represents a hydrolyzable substituent. Silanes with four hydrolyzable substituents may have formula $SiX^2{}_4$, where each $X^2$ is halogen, alkoxy or hydroxyl. Suitable alkali metal silicates include sodium silicate.

The Resin prepared as described above typically contains silicon bonded hydroxyl groups, i.e., of formulae, $HOSi_{3/2}$ and/or $HOR^M{}_2SiO_{1/2}$. The Polyorganosilicate Resin may comprise up to 2% of silicon bonded hydroxyl groups. The concentration of silicon bonded hydroxyl groups present in the Resin may be determined using Fourier Transform-Infra Red (FTIR) spectroscopy according to ASTM Standard E-168-16. For certain applications, it may be desirable for the amount of silicon bonded hydroxyl groups to be below 0.7%, alternatively below 0.3%, alternatively less than 1%, and alternatively 0.3% to 0.8%. Silicon bonded hydroxyl groups formed during preparation of the Resin can be converted to trihydrocarbyl siloxane groups or to a different hydrolyzable group by reacting the Resin with a silane, disiloxane, or disilazane containing the appropriate terminal group. Silanes containing hydrolyzable groups may be added in molar excess of the quantity required to react with the silicon bonded hydroxyl groups on the Resin.

Alternatively, the Resin may further comprises 2% or less, alternatively 0.7% or less, and alternatively 0.3% or less, and alternatively 0.3% to 0.8% of units represented by formula $XSiO_{3/2}$ and/or $XR^M{}_2SiO_{1/2}$ where $R^M$ is as described above, and X represents a hydrolyzable substituent, as described above for $X^3$.

Alternatively, the Resin may have terminal aliphatically unsaturated groups. The Resin having terminal aliphatically unsaturated groups may be prepared by reacting the product of Daudt, et al. with an unsaturated organic group-containing endblocking agent and an endblocking agent free of aliphatic unsaturation, in an amount sufficient to provide from 3 to 30 mole percent of unsaturated organic groups in the final product. Examples of endblocking agents include, but are not limited to, silazanes, siloxanes, and silanes. Suitable endblocking agents are known in the art and exemplified in U.S. Pat. Nos. 4,584,355; 4,591,622; and 4,585,836. A single endblocking agent or a mixture of such agents may be used to prepare such resin.

Alternatively, the Resin may comprise unit formula (R-1): $(R^1R^2{}_2SiO_{1/2})_w(R^2{}_3SiO_{1/2})_x(SiO_{4/2})_yX_z$, where $R^2$ and X are as described above, each $R^1$ is an independently selected aliphatically unsaturated group of 2 to 18 carbon atoms (such as that described above for $R^3$), and subscripts w, x, y, and z have average values such that w≥0, x≥0, y>1, z≥0, and a quantity (w+x)>4. Alternatively, each $R^2$ in unit formula (R-1) may be alkyl, alternatively methyl. A quantity (w+x+y+z) is sufficient to give the Resin a weight average molecular weight of 2,000 g/mol to 15,000 g/mole, alternatively 8,000 to 10,000, and alternatively 9,000 to 9,500. Alternatively, each $R^1$ may be independently selected from the group consisting of vinyl, allyl, and hexenyl. Alternatively, each X may be OH. Alternatively, subscript x may be 40 to 55, alternatively 43 to 50. Alternatively, subscript y may be 45 to 65, alternatively 50 to 57. Alternatively, subscript z may be 0 to a value sufficient to provide the resin with up to 2 weight % OH groups, alternatively up to 0.7 weight % OH groups. Alternatively, the Resin may comprise unit formula (R-2): $(R^2{}_3SiO_{1/2})_v(SiO_{4/2})_yX_z$, where $R^2$, X, subscript y, and subscript z are as described above and subscript v>4.

The Resin described above may be prepared in solvent but is then subsequently devolatilized. For example, the Resin may be dried by heating to a temperature up to 150° C. to remove solvent without degrading the Resin. For example, the Resin may be heated, optionally with reduced pressure to remove solvent. The solventless polyorganosilicate resin contains non-detectable or 0 to 2%, alternatively 0% to 1%, alternatively 0 ppm to 100 ppm of residual solvent, e.g., from the resin manufacturing process. In the method for preparing the Pellet, the solventless polyorganosilicate resin used may be in the form of a powder or flake.

Method of Preparing Solventless
Polyorganosiloxane Pellet

The solventless polyorganosiloxane pellet (Pellet) comprises the Resin and the Gum, described above. The Pellet is solventless, and as used herein, the term 'solventless' means that solvent is not intentionally added during manufacture of the Pellet. One skilled in the art would recognize that polyorganosilicate resins may be prepared with the use of solvents, however, the solventless polyorganosilicate resin used in this method has been devolatilized as described above to remove any solvent, and that solvent is not added during the method of making the Pellet. The solventless polyorganosilicate resin may be fed into the extruder as a flake or powder.

A method for preparing the Pellet described above comprises:

1) providing an extruder comprising a barrel having a first feed port, a second feed port, and an outlet with a die; heating means configured to heat the barrel; and a screw mechanism housed within the barrel, where the first feed port and the second feed port are configured to introduce starting materials into the extruder, the screw mechanism is capable of mixing and conveying the starting materials from the first feed port and the second feed port to the outlet, the first feed port is upstream of the second feed port, and the second feed port is upstream of the outlet;

2) adding i) at least a portion of a Gum as described above into the extruder through the first feed port, and adding ii) a Resin as described above into the extruder through the second feed port, wherein said Gum and said Resin are added in amounts such that a weight ratio Resin:Gum is 2.1:1 to 3.5:1;

3) mixing the Gum and the Resin in the barrel and while heating the barrel at a temperature of 200° C. to 250° C., thereby forming a mixture;
4) conveying the mixture through the die at the outlet, thereby forming a strand;
4) cooling the strand exiting the die, and
5) comminuting the strand, thereby preparing the Pellet.

The method described above may optionally further comprise preparing a solvent-borne polyorganosilicate resin and devolatilizing the solvent-borne polyorganosilicate resin to form the solventless polyorganosilicate resin before step 2).

In the method described above, all of the Gum may be added in the first feed port. Alternatively, up to 15% of the Gum may be added in the second feed port (e.g., in a blend with the Resin).

Steps 4) and 5) may be performed sequentially or concurrently. For example, steps 4) and 5) may be performed concurrently (i.e., in one piece of equipment) such as an underwater pelletizer. Alternatively, steps 4) and 5) may be performed sequentially using separate pieces of equipment, such as a water bath for cooling the strand in step 4) and a separate pelletizer in step 5). Commercially available equipment may be used to perform the method described above. Extruders, such as twin-screw extruders, and pelletizing equipment are known in the art and are commercially available. The resulting Pellet prepared as described above is useful for preparing a silicone pressure sensitive adhesive.

Silicone Pressure Sensitive Adhesive

The silicone pressure sensitive adhesive may be formed from a curable silicone pressure sensitive adhesive composition including the Pellet. The curable silicone pressure sensitive adhesive composition may be a hydrosilylation reaction curable silicone pressure sensitive adhesive composition comprising:
A) the Pellet described above,
B) a polyorganohydrogensiloxane,
C) a catalyst,
D) an aliphatically unsaturated polydiorganosiloxane polymer,
optionally E) an anchorage additive,
optionally F) a branched aliphatically unsaturated polyorganosiloxane,
optionally G) a catalyst inhibitor, and
optionally H) a solvent.

Starting Material B) Crosslinker

Starting material B) is a polyorganohydrogensiloxane. Starting material B) acts as a crosslinker in the hydrosilylation reaction curable silicone pressure sensitive adhesive composition. Starting material B) may have at least 2, alternatively least 3, silicon bonded hydrogen atoms per molecule.

Starting material B) may comprise a polyorganohydrogensiloxane of unit formula (b-1) $(R^8_3SiO_{1/2})_p(R^8_2SiO_{2/2})_q(R^8SiO_{3/2})_r(SiO_{4/2})_s(R^8HSiO_{2/2})_t(R^8_2HSiO_{1/2})_u$, where each $R^8$ is an independently selected monovalent hydrocarbon group, and subscripts p, q, r, s, t, and u have values such that p≥0, q≥0, r≥0, s≥0, t≥0, u≥0, (t+u)≥2, and a quantity (p+q+r+s+t+u) is sufficient to provide the polyorganohydrogensiloxane with a degree of polymerization of 5 to 100, alternatively 10 to 60. Suitable monovalent hydrocarbon groups for $R^8$ may have 1 to 20 carbon atoms, alternatively 1 to 12 carbon atoms, alternatively 1 to 8 carbon atoms, alternatively 1 to 4 carbon atoms, and alternatively 1 to 2 carbon atoms. Alternatively, the hydrocarbon groups for $R^8$ may be selected from the group consisting of alkyl groups, alkenyl groups and aryl groups; alternatively alkyl and aryl; and alternatively alkyl. The alkyl groups are exemplified by methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl, as well as branched saturated monovalent hydrocarbyl groups of 6 or more carbon atoms including cycloalkyl groups such as cyclopentyl and cyclohexyl. The aryl groups are exemplified by cyclopentadienyl, phenyl, tolyl, xylyl, anthracenyl, benzyl, 1-phenylethyl, 2-phenylethyl, and naphthyl. Monocyclic aryl groups may have 5 to 9 carbon atoms, alternatively 6 to 7 carbon atoms, and alternatively 5 to 6 carbon atoms. Polycyclic aryl groups may have 10 to 17 carbon atoms, alternatively 10 to 14 carbon atoms, and alternatively 12 to 14 carbon atoms. Alternatively, each $R^8$ may be an alkyl group or an aryl group. Alternatively, each $R^8$ may be methyl or phenyl. Alternatively, each $R^8$ may be methyl.

Alternatively, starting material B) may comprise a polyorganohydrogensiloxane of unit formula (b-2): $(R^8_3SiO_{1/2})_2(R^8_2SiO_{2/2})_{aa}(R^8HSiO_{2/2})_{bb}$, where each $R^8$ is selected from the group consisting of methyl and phenyl, subscript aa is 0 to 30, and subscript bb is 5 to 50.

Alternatively, starting material B) may comprise a polyorganohydrogensiloxane of

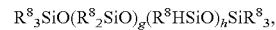
$R^8_3SiO(R^8_2SiO)_g(R^8HSiO)_hSiR^8_3$,   Formula (b-3):

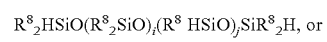
$R^8_2HSiO(R^8_2SiO)_i(R^8HSiO)_jSiR^8_2H$, or   Formula (b-4):

both (b-3) and (b-4). In formulae (b-3) and (b-4), $R^8$ is as described above. Subscript g has an average value of 0 to 2000, subscript h has an average value of 2 to 2000, subscript i has an average value of 0 to 2000, and subscript j has an average value of 0 to 2000.

Polyorganohydrogensiloxanes for starting material B) are exemplified by: (b-5) α,ω-dimethylhydrogensiloxy-terminated polydimethylsiloxane, (b-6) α,ω-dimethylhydrogensiloxy-terminated poly(dimethylsiloxane/methylhydrogensiloxane), (b-7) α,ω-dimethylhydrogensiloxy-terminated polymethylhydrogensiloxane, (b-8) α,ω-trimethylsiloxy-terminated poly(dimethylsiloxane/methylhydrogensiloxane), (b-9) α,ω-trimethylsiloxy-terminated polymethylhydrogensiloxane, (b-10) α,ω-trimethylsiloxy-terminated poly(dimethylsiloxane/methylphenylsiloxane/methylhydrogensiloxane), (b-11) α,ω-trimethylsiloxy terminated dimethylhydrogensiloxy-terminated poly(methylphenylsiloxane/dimethylsiloxane), (b-12) α,ω-dimethylhydrogensiloxy-terminated polymethylphenylsiloxane, and (b-13) a combination of two or more of (b-5), (b-6), (b-7), (b-8), (b-9), (b-10), (b-11), and (b-12).

Methods of preparing polyorganohydrogensiloxanes, such as hydrolysis and condensation of organohalosilanes, are well known in the art. Polyorganohydrogensiloxanes are commercially available. For example, DOWSIL™ 6-3570, DOWSIL™ RMS-777, SYL-OFF™ 7028, SYL-OFF™ 7058, SYL-OFFT™ 7049, SYL-OFF™ 7136, and SYL-OFF™ 7682-055 are each commercially available from Dow Silicones Corporation of Midland, Michigan, USA.

The amount of starting material B) depends on various factors including the concentration of aliphatically unsaturated monovalent hydrocarbon groups in the composition and the SiH content of starting material B), and whether a solvent is present. However, the amount of starting material B) may be 0.01% to 10%, alternatively 3% to 8%, and alternatively 0.01 to 5%, based on combined weights of all starting materials in the curable silicone pressure sensitive adhesive composition. However, the amount of starting material B) may be sufficient to provide a total mole ratio of silicone bonded hydrogen to aliphatically unsaturated groups of the other starting materials in the composition (overall SiH/Vi ratio) of 0.5/1 to 50/1, alternatively 1/1 to 20/1, alternatively 1/1 to 10/1, and alternatively 2/1 to 6/1.

Starting Material C) Catalyst

Starting material C) in the hydrosilylation reaction curable silicone pressure sensitive adhesive composition is a hydrosilylation reaction catalyst. Hydrosilylation reaction catalysts are known in the art and are commercially available. Hydrosilylation reaction catalysts include C-1) platinum group metal catalysts. Such hydrosilylation reaction catalysts can be a metal selected from platinum, rhodium, ruthenium, palladium, osmium, and iridium. Alternatively, the hydrosilylation reaction catalyst may be C-2) a compound of such a metal, for example, chloridotris(triphenylphosphane)rhodium(I) (Wilkinson's Catalyst), a rhodium diphosphine chelate such as [1,2-bis(diphenylphosphino)ethane]dichlorodirhodium or [1,2-bis(diethylphospino)ethane]dichlorodirhodium, chloroplatinic acid (Speier's Catalyst), chloroplatinic acid hexahydrate, platinum dichloride, and C-3) complexes of said compounds with low molecular weight organopolysiloxanes or C-4) platinum group metal compounds microencapsulated in a matrix or coreshell type structure. Complexes of platinum with low molecular weight organopolysiloxanes include 1,3-diethenyl-1,1,3,3-tetramethyldisiloxane complexes with platinum (Karstedt's Catalyst) and Pt(0) complex in tetramethyltetravinylcyclotetrasiloxane (Ashby's Catalyst). Alternatively, the hydrosilylation reaction catalyst may be C-5) a complex, as described above, microencapsulated in a resin matrix. Exemplary hydrosilylation reaction catalysts are described in U.S. Pat. Nos. 3,159,601; 3,220,972; 3,296,291; 3,419,593; 3,516,946; 3,814,730; 3,989,668; 4,784,879; 5,036,117; and 5,175,325; and EP 0 347 895 B. Microencapsulated hydrosilylation reaction catalysts and methods of preparing them are known in the art, as exemplified in U.S. Pat. Nos. 4,766,176 and 5,017,654. Hydrosilylation reaction catalysts are commercially available, for example, SYL-OFF™ 4000 Catalyst and SYL-OFF™ 2700 are available from Dow Silicones Corporation.

The amount of hydrosilylation reaction catalyst used herein will depend on various factors including the selection of starting materials and their respective contents of silicon bonded hydrogen atoms and aliphatically unsaturated groups, and the content of the platinum group metal in the catalyst selected, however, the amount of hydrosilylation reaction catalyst is sufficient to catalyze hydrosilylation reaction of SiH and aliphatically unsaturated groups, alternatively the amount of catalyst is sufficient to provide 1 ppm to 6,000 ppm of the platinum group metal based on combined weights of starting materials containing silicon bonded hydrogen atoms and aliphatically unsaturated hydrocarbon groups; alternatively 1 ppm to 1,000 ppm, and alternatively 1 ppm to 100 ppm, on the same basis.

Starting Material D) Aliphatically Unsaturated Polymer

The curable silicone pressure sensitive adhesive composition described above further comprises starting material D) a polydiorganosiloxane having at least one silicon bonded aliphatically unsaturated monovalent hydrocarbon group per molecule. This polydiorganosiloxane comprises unit formula: $(R^4_2R^5SiO_{1/2})_r(R^4_3SiO_{1/2})_s(R^4_2SiO_{2/2})_t(R^4R^5SiO_{2/2})_u$, where $R^4$ is a monovalent hydrocarbon group free of aliphatic unsaturation as described above for $R^2$, each $R^5$ is an independently selected monovalent hydrocarbon group having aliphatic unsaturation such as the aliphatically unsaturated group for $R^3$ as described above, subscript r is 0 to 2, subscript s is 0 to 2, a quantity (r+s)=2, subscript t≥0, subscript u≥0, a quantity (r+u)≥1, and a quantity (r+s+t+u) is sufficient to give the polydiorganosiloxane a viscosity of 100 mPa·s to 60,000 mPa·s at 25° C. measured at 0.1 to 50 RPM on a Brookfield Dv-III cone & plate viscometer with #CP-52 spindle. One skilled in the art would recognize that rotation rate decreases as viscosity increases and would be able to select the appropriate rotation rate when using this test method to measure viscosity. Alternatively, each $R^5$ may be independently selected from the group consisting of alkenyl and alkynyl groups, of 2 to 20 carbon atoms, alternatively 2 to 12 carbon atoms, alternatively 2 to 6 carbon atoms. Alternatively, each $R^5$ may be an alkenyl group of 2 to 6 carbon atoms. Alternatively, viscosity may be 100 mPa·s to 10,000 mPa·s, and alternatively 100 mPa·s to 5,000 mPa·s, alternatively 2,000 mPa·s to 10,000 mPa·s, and alternatively 2,000 mPa·s to 5,000 mPa·s, and alternatively 2,000 to 5,000 mPa·s measured according to the test method described above at 5 RPM. Alternatively, subscript u may be 0 to 4, alternatively 0 to 2, alternatively 0 to 3, and alternatively 0. Alternatively, a quantity (r+u) may be sufficient to provide an amount of aliphatically unsaturated groups, $R^5$, of 0.05% to 7%, alternatively 0.09% to 6.5%, based on weight of the polydiorganosiloxane. Vinyl content may be measured by $^{29}Si$ NMR and $^{13}C$ NMR spectroscopy.

$^{29}Si$ NMR and $^{13}C$ NMR spectroscopy can be used to quantify the total aliphatically unsaturated (R') group content in a polydiorganosiloxane comprising units selected from the group consisting of:

M unit of formula $(R_3SiO_{1/2})$; M(R') unit of formula $(R_2R'SiO_{1/2})$, D unit of formula $(R_2SiO_{2/2})$, and/or D(R') unit of formula $(RR'SiO_{2/2})$, where R is $R^4$ described above and R' is $R^5$ as described above. A $^{29}Si$ NMR spectrum should be acquired using the methodology outlined by Taylor et. al. in Chapter 12 of *The Analytical Chemistry of Silicones*, ed. A. Lee Smith, Vol. 112 in Chemical Analysis, John Wiley & Sons, Inc. (1991), pages 347-417, and section 5.5.3.1. In this chapter, the authors discuss general parameters unique to acquiring quantitative NMR spectra from Silicon nuclei. Each NMR spectrometer is different with respect to the electronic components, capabilities, sensitivity, frequency and operating procedures. One should consult instrument manuals for the spectrometer to be used in order to tune, shim and calibrate a pulse sequences sufficient for quantitative 1D measurement of $^{29}Si$ and $^{13}C$ nuclei in a sample.

A key output of a NMR analysis is the NMR spectrum. Without standards, it is recommended that the signal to noise ratio of signal height to average baseline noise be no less than 10:1 to be considered quantitative. A properly acquired and processed NMR spectrum results in signals that can be integrated using any commercially available NMR processing software package.

From these integrations, the weight percent of total alkenyl can be calculated from the $^{29}Si$ NMR spectrum according to the following: $(I^M)\cdot(U^M)=G^M$; $(I^{M(R')})\cdot(U^{M(R')})=G^{M(R')}$; $(I^D)\sim(U^D)=G^D$; $(I^{D(R')})\cdot(U^{D(R')})=G^{D(R')}U^{R'}/U^{M(R')}=Y^{R''}$; $U^{R'}/U^{D(R')}=Y^{R''}$; $Y^{R''}\cdot[G^{M(R')}/G^M+G^{M(R')}+G^D+D^{D(R')}]\cdot100]=W^{R''}$; $Y^{R'''}\cdot[G^{D(R')}/G^M+G^{M(R')}+G^D+$ $D^{D(R')}) \cdot 100] = W^{R'''}$; and $W^{R''} + W^{R'''} = \text{TOTAL } W^{R'}$; where I is the integrated signal of the indicated siloxy group; U is the unit molecular weight of the indicated siloxy group; G is a placeholder representing the grams unit; W is the weight percent of the indicated siloxy unit; Y is a ratio value for the specified siloxy unit; R' represents alkenyl; R'' represents alkenyl groups only from M(R'); R''' represents alkenyl only from D(R') groups.

Alternatively, in the unit formula for the polydiorganosiloxane above, each $R^4$ may be an alkyl group of 1 to 18 carbon atoms, alternatively 1 to 12 carbon atoms, alternatively 1 to 6 carbon atoms, and alternatively 1 to 4 carbon atoms. Suitable alkyl groups include methyl, ethyl, propyl (including n-propyl and iso-propyl), and butyl (including n-butyl, tert-butyl, sec-butyl, and iso-butyl). Alternatively, each $R^4$ may be methyl.

Alternatively, in the unit formula for the polydiorganosiloxane above, each $R^5$ may be an alkenyl group of 2 to 18 carbon atoms, alternatively 2 to 12 carbon atoms, alternatively 2 to 6 carbon atoms, and alternatively 2 to 4 carbon atoms. Suitable alkenyl groups include vinyl, allyl, butenyl, and hexenyl Alternatively, each $R^5$ may be vinyl or hexenyl. Alternatively, each $R^5$ may be vinyl.

The polydiorganosiloxane may have a terminal aliphatically unsaturated group, a pendant aliphatically unsaturated group, or both terminal and pendant aliphatically unsaturated groups. Alternatively, in the unit formula for the polydiorganosiloxane above, subscript a may be 0 and subscript d may be greater than or equal to 1, i.e., the polydiorganosiloxane may have pendant aliphatically unsaturated groups but not terminal aliphatically unsaturated groups. Alternatively, subscript a may be 2, subscript b may be 0 and subscript d may be 0, $R^5$ may be alkenyl, and $R^4$ may be alkyl, and the polydiorganosiloxane may be a bis-alkenyl-terminated polydiorganosiloxane.

The bis-alkenyl-terminated polydiorganosiloxane may comprise formula

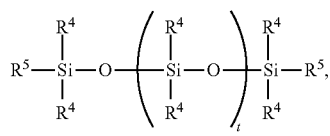

where each $R^4$ and $R^5$ are as described above, and subscript t has a value sufficient to give the polydiorganosiloxane the viscosity of 100 mPa·s to 60,000 mPa·s measured as described above. One skilled in the art would recognize that rotation rate decreases as viscosity increases and would be able to select the appropriate rotation rate when using this test method to measure viscosity. Alternatively, viscosity may be 100 mPa·s to 10,000 mPa·s, alternatively 100 mPa·s to 5,000 mPa·s, alternatively 2,000 mPa·s to 10,000 mPa·s, and alternatively 2,000 mPa·s to 5,000 mPa·s, measured according to the test method described above at 5 RPM.

Alternatively, each $R^4$ may be an alkyl group of 1 to 18 carbon atoms, alternatively 1 to 12 carbon atoms, alternatively 1 to 6 carbon atoms, and alternatively 1 to 4 carbon atoms. Suitable alkyl groups include methyl, ethyl, propyl (including n-propyl and iso-propyl), and butyl (including n-butyl, tert-butyl, sec-butyl, and iso-butyl). Alternatively, each $R^4$ may be methyl.

Alternatively, in the formula for the polydiorganosiloxane above, each $R^5$ may be an alkenyl group of 2 to 12 carbon atoms, alternatively 2 to 6 carbon atoms, and alternatively 2 to 4 carbon atoms. Suitable alkenyl groups include vinyl, allyl, butenyl, and hexenyl. Alternatively, each $R^5$ may be vinyl or hexenyl. Alternatively, each $R^5$ may be vinyl.

Starting material D) may comprise a polydiorganosiloxane such as d-1) α,ω-dimethylvinylsiloxy-terminated polydimethylsiloxane, d-2) α,ω-dimethylvinylsiloxy-terminated poly(dimethylsiloxane/methylphenylsiloxane), d-3) α,ω-dimethylvinylsiloxy-terminated poly(dimethylsiloxane/diphenylsiloxane), d-4) α,ω-phenyl,methyl,vinyl-siloxy-terminated polydimethylsiloxane, d-5) α,ω-dimethylhexenylsiloxy-terminated polydimethylsiloxane, d-6) α,ω-dimethylhexenylsiloxy-terminated poly(dimethylsiloxane/methylphenylsiloxane), d-7) α,ω-dimethylhexenylsiloxy-terminated poly(dimethylsiloxane/diphenylsiloxane), d-8) α,ω-phenyl,methyl,hexenyl-siloxy-terminated polydimethylsiloxane, d-9) α,ω-dimethylvinylsiloxy-terminated poly(dimethylsiloxane/methylvinylsiloxane), d-10) α,ω-dimethylvinylsiloxy-terminated poly(dimethylsiloxane/methylphenylsiloxane/methylvinylsiloxane), d-11) α,ω-dimethylvinylsiloxy-terminated poly(dimethylsiloxane/diphenylsiloxane/methylvinylsiloxane), d-12) α,ω-phenyl,methyl,vinyl-siloxy-terminated poly(dimethylsiloxane/methylvinylsiloxane), d-13) α,ω-dimethylhexenylsiloxy-terminated poly(dimethylsiloxane/methylhexenylsiloxane), d-14) α,ω-dimethylhexenylsiloxy-terminated poly(dimethylsiloxane/methylphenylsiloxane/methylhexenylsiloxane), d-15) α,ω-dimethylhexenylsiloxy-terminated poly(dimethylsiloxane/diphenylsiloxane/methylhexenylsiloxane), d-16) α,ω-phenyl,methyl,hexenyl-siloxy-terminated poly(dimethylsiloxane/methylhexenylsiloxane), d-17) trimethylsiloxy-terminated poly(dimethylsiloxane/methylvinylsiloxane), d-18) trimethylsiloxy-terminated poly(dimethylsiloxane/methylphenylsiloxane/methylvinylsiloxane), d-19) trimethylsiloxy-terminated poly(dimethylsiloxane/diphenylsiloxane/methylvinylsiloxane), d-20) trimethylsiloxy-terminated poly(dimethylsiloxane/methylhexenylsiloxane), d-21) trimethylsiloxy-terminated poly(dimethylsiloxane/methylphenylsiloxane/methylhexenylsiloxane), d-22) trimethylsiloxy-terminated poly(dimethylsiloxane/diphenylsiloxane/methylhexenylsiloxane), d-23) a combination of two or more of d-1) to d-22). Alternatively, the polydiorganosiloxane may be selected form the group consisting of d-1), d-5), d-9), d-13), d-17), d-20), and a combination of two or more thereof. Alternatively, the polydiorganosiloxane may be selected form the group consisting of d-1), d-5), d-9), d-13), and a combination of two or more thereof. Alternatively, the polydiorganosiloxane may be a bis-vinyldimethylsiloxy-terminated polydimethylsiloxane. Polydiorganosiloxanes described above are commercially available. Bis-vinyldimethylsiloxy-terminated polydimethylsiloxanes are commercially available from Dow Silicones Corporation of Midland, Michigan, USA, and examples include bis-vinyldimethylsiloxy-terminated polydimethylsiloxane with a viscosity of 60,000 mPa·s, bis-vinyldimethylsiloxy-terminated polydimethylsiloxane with a viscosity of 11,500 mPa·s, bis-vinyldimethylsiloxy-terminated polydimethylsiloxane with a viscosity of 5,000 mPa·s, and bis-vinyldimethylsiloxy-terminated polydimethylsiloxane with a viscosity of 2,000 mPa·s, where viscosity was measured 25° C. at 0.1 to 50 RPM on a Brookfield DV-III cone & plate viscometer with #CP-52 spindle. Suitable polydiorganosiloxanes may be prepared by methods known in the art such as hydrolysis and condensation of appropriate organohalosilane monomers and/or equilibration of linear and cyclic polyorganosiloxanes optionally with endcapping.

Starting material D) may be one polydiorganosiloxane or may be a combination of two or more polydiorganosiloxanes that differ from one another by at least one property such as selection of $R^4$ groups, selection of $R^5$ groups, and viscosity.

The amounts of starting materials A) and D) are selected such that the curable silicone pressure sensitive adhesive composition has a weight ratio of resin to polymer (i.e., amount of Resin from the pellet to combined amounts of Gum from the pellet and aliphatically unsaturated polymer (D) of >0:1 to 2.0:1. Alternatively, this resin to polymer weight ratio (R:P ratio) may be 0.2:1 to 1.8:1.

Starting Material E) Anchorage Additive

Starting material E) is an anchorage additive that may optionally be included in the curable silicone pressure sensitive adhesive composition. Without wishing to be bound by theory, it is thought that the anchorage additive will facilitate bonding to a substrate by a silicone pressure sensitive adhesive prepared by curing the curable silicone pressure sensitive adhesive composition described herein. However, the presence of the anchorage additive will not detrimentally affect the desired peel force allowing the silicone pressure sensitive adhesive to be removed from an adherend without damaging the adherend or leaving significant residue.

Suitable anchorage additives include silane coupling agents such as methyltrimethoxysilane, vinyltrimethoxysilane, allyltrimethoxysilane, 3-methacryloxypropyltrimethoxysilane, 3-aminopropyltrimethoxysilane, N-(2-aminoethyl)-3-aminopropyltrimethoxysilane, bis(trimethoxysilyl)propane, and bis(trimethoxysilyl)hexane; and mixtures or reaction mixtures of said silane coupling agents. Alternatively, the anchorage additive may be tetramethoxysilane, tetraethoxysilane, dimethyldimethoxysilane, methylphenyldimethoxysilane, methylphenyldiethoxysilane, phenyltrimethoxysilane, methyltrimethoxysilane, methyltriethoxysilane, vinyltriethoxysilane, allyltriethoxysilane, 3-glycidoxypropyltrimethoxysilane, 3-glycidoxypropyltriethoxysilane, -(3,4-epoxycyclohexyl)ethyltrimethoxysilane or 3-methacryloxypropyl trimethoxysilane.

Alternatively, the anchorage additive may be exemplified by a reaction product of an alkenyl-functional alkoxysilane (e.g., a vinyl alkoxysilane) and an epoxy-functional alkoxysilane; a reaction product of an alkenyl-functional acetoxysilane (such as vinyl acetoxysilane) and epoxy-functional alkoxysilane; and a combination (e.g., physical blend and/or a reaction product) of a polyorganosiloxane having at least one aliphatically unsaturated hydrocarbon group and at least one hydrolyzable group per molecule and an epoxy-functional alkoxysilane (e.g., a combination of a hydroxy-terminated, vinyl functional polydimethylsiloxane with glycidoxypropyltrimethoxysilane). Suitable anchorage additives and methods for their preparation are disclosed, for example, in U.S. Pat. No. 9,562,149; U.S. Patent Application Publication Numbers 2003/0088042, 2004/0254274, 2005/0038188, 2012/0328863 at paragraph [0091], and U.S. Patent Publication 2017/0233612 at paragraph [0041]; and EP 0 556 023.

Anchorage additives are commercially available. For example, SYL-OFF™ 297, SYL-OFF™ 397, and SYL-OFF™ 9176 are available from Dow Silicones Corporation of Midland, Michigan, USA. Other exemplary anchorage additives include (E-1) vinyltriacetoxysilane, (E-2) glycidoxypropyltrimethoxysilane, (E-3) a combination of (E-1) and (E-2), (E-4) a combination of (E-3) and a polydimethylsiloxane terminated with hydroxyl groups, methoxy groups, or terminated with both a hydroxy group and a methoxy group, and (E-5) 2-(3,4-epoxycyclohexyl)ethyltrimethoxysilane. The combinations (E-3) and (E-4) may be physical blends and/or reaction products.

The amount of anchorage additive depends on various factors including the type of substrate to which the curable silicone pressure sensitive adhesive composition will be applied and whether a primer or other surface treatment will be used before application of the curable silicone pressure sensitive adhesive composition. However, the amount of anchorage additive may be 0 to 5%, alternatively 1% to 5%, and alternatively 1% to 3% based on combined weights of all starting materials in the curable silicone pressure sensitive adhesive composition.

Starting Material F) Branched Aliphatically Unsaturated Polyorganosiloxane

Starting material F) in the curable silicone pressure sensitive adhesive composition described herein is a branched aliphatically unsaturated polyorganosiloxane. Starting material F) may comprise a Q branched polyorganosiloxane of unit formula (f-1) $(R^6_3SiO_{1/2})_g(R^6_2R_7SiO_{1/2})_h(R^6_2SiO_{2/2})_i(SiO_{4/2})_j$, where $R^6$ is an alkyl group of 1 to 18 carbon atoms (such as the alkyl groups described above), $R^7$ is an alkenyl group of 2 to 18 carbon atoms (such as the alkenyl groups described above), and subscripts g, h, i, and j have average values such that 2≥g≥0, 4≥h≥0, 995≥i≥0, j=1, (g+h)=4, and (g+h+i+j) has a value sufficient to impart a viscosity >1 mPa·s measured by rotational viscometry (as described below in the Reference Examples) to the branched polyorganosiloxane. Alternatively, viscosity may be >170 mPa·s to 1000 mPa·s, alternatively >170 to 500 mPa·s, alternatively 180 mPa·s to 450 mPa·s, and alternatively 190 mPa·s to 420 mPa·s. Suitable branched siloxanes for starting material (f-1) are exemplified by those disclosed in U.S. Pat. No. 6,806,339 and U.S. Patent Publication 2007/0289495. Alternatively, the Q branched polyorganosiloxane of unit formula (f-1) may have subscripts g=0, h=4, i=0, and j=1. Examples of suitable Q branched polyorganosiloxanes include tetrakis(vinyldimethylsiloxy)silane.

The amount of starting material (F) depends on various factors including the concentration of aliphatically unsaturated groups and silicon bonded hydrogen atoms of the starting materials in the curable silicone pressure sensitive adhesive composition, and whether an inhibitor is present. However, the amount of starting material (F) may be 5% to 80%, alternatively 10% to 75%, alternatively 15% to 70%, alternatively 20% to 65%, alternatively 25% to 60%, based on combined weights of all starting materials in the curable silicone pressure sensitive adhesive composition.

Starting Material G) Catalyst Inhibitor

Starting material G) in the hydrosilylation reaction curable silicone pressure sensitive adhesive composition is a hydrosilylation reaction inhibitor (inhibitor) that may optionally be used for altering rate of reaction of the silicon bonded hydrogen atoms of starting material B) and the aliphatically unsaturated hydrocarbon groups in starting materials A), and D), and when present F), as compared to reaction rate of the same starting materials but with the inhibitor omitted. Inhibitors are exemplified by acetylenic alcohols such as methyl butynol, ethynyl cyclohexanol, dimethyl hexynol, and 3,5-dimethyl-1-hexyn-3-ol, 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, 3,5-dimethyl-1-hexyn-3-ol, and 1-ethynyl-1-cyclohexanol, and a combination thereof;

olefinic siloxanes such as cycloalkenylsiloxanes exemplified by methylvinylcyclosiloxanes exemplified by 1,3,5,7-tetramethyl-1,3,5,7-tetravinylcyclotetrasiloxane, 1,3,5,7-tetramethyl-1,3,5,7-tetrahexenylcyclotetrasiloxane, and a combination thereof; ene-yne compounds such as 3-methyl-3-penten-1-yne, 3,5-dimethyl-3-hexen-1-yne, and a combination thereof; triazoles such as benzotriazole; phosphines; mercaptans; hydrazines; amines, such as tetramethyl ethylenediamine, 3-dimethylamino-1-propyne, n-methylpropargylamine, propargylamine, and 1-ethynylcyclohexylamine; dialkyl fumarates such as diethyl fumarate, dialkenyl fumarates such as diallyl fumarate, dialkoxyalkyl fumarates, maleates such as diallyl maleate and diethyl maleate; nitriles; ethers; carbon monoxide; alkenes such as cyclooctadiene, divinyltetramethyldisiloxane; alcohols such as benzyl alcohol; and a combination thereof. Exemplary olefinic siloxanes are disclosed, for example, in U.S. Pat. No. 3,989,667. Exemplary acetylenic alcohols are disclosed, for example, in U.S. Pat. No. 3,445,420.

Alternatively, the inhibitor may be a silylated acetylenic compound. Without wishing to be bound by theory, it is thought that adding a silylated acetylenic compound reduces yellowing of the reaction product prepared from hydrosilylation reaction as compared to a reaction product from hydrosilylation of starting materials that do not include a silylated acetylenic compound or that include an organic acetylenic alcohol inhibitor, such as those described above.

The silylated acetylenic compound is exemplified by (3-methyl-1-butyn-3-oxy)trimethylsilane, ((1,1-dimethyl-2-propynyl)oxy)trimethylsilane, bis(3-methyl-1-butyn-3-oxy)dimethylsilane, bis(3-methyl-1-butyn-3-oxy)silanemethylvinylsilane, bis((1,1-dimethyl-2-propynyl)oxy)dimethylsilane, methyl(tris(1,1-dimethyl-2-propynyloxy))silane, methyl(tris(3-methyl-1-butyn-3-oxy))silane, (3-methyl-1-butyn-3-oxy)dimethylphenylsilane, (3-methyl-1-butyn-3-oxy)dimethylhexenylsilane, (3-methyl-1-butyn-3-oxy)triethylsilane, bis(3-methyl-1-butyn-3-oxy)methyltrifluoropropylsilane, (3,5-dimethyl-1-hexyn-3-oxy)trimethylsilane, (3-phenyl-1-butyn-3-oxy)diphenylmethylsilane, (3-phenyl-1-butyn-3-oxy)dimethylphenylsilane, (3-phenyl-1-butyn-3-oxy)dimethylvinylsilane, (3-phenyl-1-butyn-3-oxy)dimethylhexenylsilane, (cyclohexyl-1-ethyn-1-oxy)dimethylhexenylsilane, (cyclohexyl-1-ethyn-1-oxy)dimethylvinylsilane, (cyclohexyl-1-ethyn-1-oxy)diphenylmethylsilane, (cyclohexyl-1-ethyn-1-oxy)trimethylsilane, and combinations thereof. Alternatively, the silylated acetylenic compound is exemplified by methyl(tris(1,1-dimethyl-2-propynyloxy))silane, ((1,1-dimethyl-2-propynyl)oxy)trimethylsilane, or a combination thereof. The silylated acetylenic compound useful as the inhibitor herein may be prepared by methods known in the art, for example, U.S. Pat. No. 6,677,407 discloses silylating an acetylenic alcohol described above by reacting it with a chlorosilane in the presence of an acid receptor.

The amount of inhibitor added herein will depend on various factors including the desired reaction rate, the particular inhibitor used, and the selection and amount of silicon bonded hydrogen atoms and silicon bonded aliphatically unsaturated groups in the starting materials of the composition. However, when present, the amount of inhibitor may range from >0% to 1%, alternatively >0% to 5%, alternatively 0.001% to 3%, alternatively 0.01% to 1.5%, alternatively 0.002% to 1%, and alternatively 0.0025% to 0.5%, based on the combined weights of all starting materials.

Starting Material H) Solvent

The curable silicone pressure sensitive adhesive composition may optionally further comprise starting material H), a solvent. Suitable solvents include, polyalkylsiloxanes, alcohols, ketones, aromatic hydrocarbons, aliphatic hydrocarbons, glycol ethers, tetrahydrofuran, mineral spirits, naphtha, tetrahydrofuran, mineral spirits, naphtha, or a combination thereof. Polyalkylsiloxanes with suitable vapor pressures may be used as the solvent, and these include hexamethyldisiloxane, octamethyltrisiloxane, hexamethylcyclotrisiloxane and other low molecular weight polyalkylsiloxanes, such as 0.5 to 1.5 cSt DOWSIL™ 200 Fluids and DOWSIL™ OS FLUIDS, which are commercially available from Dow Silicones Corporation of Midland, Michigan, U.S.A.

Alternatively, starting material H) may comprise an organic solvent. The organic solvent can be an alcohol such as methanol, ethanol, isopropanol, butanol, or n-propanol; a ketone such as acetone, methylethyl ketone, or methyl isobutyl ketone; an aromatic hydrocarbon such as benzene, toluene, or xylene; an aliphatic hydrocarbon such as heptane, hexane, or octane; a glycol ether such as propylene glycol methyl ether, dipropylene glycol methyl ether, propylene glycol n-butyl ether, propylene glycol n-propyl ether, or ethylene glycol n-butyl ether, tetrahydrofuran; mineral spirits; naphtha; or a combination thereof.

The amount of solvent will depend on various factors including the type of solvent selected and the amount and type of other starting materials selected for the curable silicone pressure sensitive adhesive composition. However, the amount of solvent may be 0% to 90%, alternatively 40% to 75%, alternatively 0% to <10%, based on combined weights of all starting materials in the curable silicone pressure sensitive adhesive composition. The solvent may be added during preparation of the curable silicone pressure sensitive adhesive composition, for example, to aid mixing and delivery of one or more starting materials. For example, the catalyst may be delivered in a solvent, and or the pellet may be dissolved in a solvent. All or a portion of the solvent may optionally be removed after the curable silicone pressure sensitive adhesive composition is prepared. Alternatively, a customer may dilute the curable silicone pressure sensitive adhesive composition after receipt and before use, and in this instance the amount of solvent for dilution may be ≥10%.

Method of Making Hydrosilylation Reaction Curable Silicone Pressure Sensitive Adhesive Composition The hydrosilylation reaction curable silicone pressure sensitive adhesive composition (hydrosilylation composition) can be prepared by a method comprising combining all starting materials by any convenient means such as mixing at ambient or elevated temperature. The inhibitor may be added before the catalyst, for example, when the hydrosilylation composition will be prepared at elevated temperature and/or the hydrosilylation composition will be prepared as a one-part composition.

Alternatively, the hydrosilylation composition may be prepared as a multiple part composition, for example, when the hydrosilylation composition will be stored for a long period of time before use, e.g., up to 6 hours before coating the pressure sensitive adhesive composition on a substrate. In the multiple part composition, the hydrosilylation reaction catalyst is stored in a separate part from any starting material having a silicon bonded hydrogen atom, for example the polyorganohydrogensiloxane, and the parts are combined shortly before use of the pressure sensitive adhesive composition.

For example, a multiple part composition may be prepared by combining starting materials comprising A) the pellet described above, one or more additional aliphatically unsaturated polyorganosiloxanes, e.g., all or a portion of starting material D) and starting material F), if present, B) the polyorganohydrogensiloxane, and optionally one or more other additional starting materials described above to form a base part, by any convenient means such as mixing. A curing agent may be prepared by combining starting materials comprising C) the hydrosilylation reaction catalyst, all or a portion of starting material D) the aliphatically unsaturated polydiorganosiloxane, and optionally one or more other additional starting materials (such as inhibitor, anchorage additive, and/or solvent) described above by any convenient means such as mixing. Alternatively, the starting materials of the curing agent may be added sequentially in any order to the base part described above, however, the inhibitor may be added before the catalyst. The starting materials may be combined at ambient or elevated temperature. Alternatively, the hydrosilylation reaction inhibitor may be included in one or more of the base part, the curing agent part, or a separate additional part. Alternatively, the anchorage additive may be added to the base part or may be added as a separate additional part. Alternatively, the branched polyorganosiloxane may be added to the base part. The pellet may be added as a separate additional part. The hydrosilylation composition will cure via hydrosilylation reaction to form a silicone pressure sensitive adhesive after combination of all starting materials, which may be performed by any convenient means, such as mixing with high shear equipment, e.g., an extruder.

Free Radical Curable Silicone Pressure Sensitive Adhesive Composition

Alternatively, the pellets described above may be used to prepare a silicone pressure sensitive adhesive from a free radical curable silicone pressure sensitive adhesive composition. The free radical curable silicone pressure sensitive adhesive composition may comprise:
A) a pellet (as described above);
I) a free radical initiator;
at least one of: H) a solvent (as described above), and J) a hydroxyl-functional polydiorganosiloxane;
optionally D) an aliphatically unsaturated polydiorganosiloxane polymer (as described above);
optionally E) an anchorage additive (as described above); and
optionally F) a branched aliphatically unsaturated polyorganosiloxane (as described above). Alternatively, the free radical curable silicone pressure sensitive adhesive composition may comprise starting materials A), H), I), and J).

Starting Material I) Free Radical Initiator

Starting material I) is a free radical initiator. Starting material I) may comprise an organic peroxide compound, such as an alkyl peroxide, a diacyl peroxide, a peroxide ester, and/or a peroxide carbonate. Suitable organic peroxide compounds include benzoyl peroxide; 4-monochlorobenzoyl peroxide; dicumyl peroxide; tert-butylperoxybenzoate; tert-butyl cumyl peroxide; tert-butyloxide 2,5-dimethyl-2,5- di-tert-butylperoxyhexane; 2,4-dichlorobenzoyl peroxide; di-tertbutylperoxy-diisopropyl benzene; 1,1-bis(tert-butylperoxy)-3,3,5-trimethylcyclohexane; 2,5-di-tert-butylperoxyhexane-3,2,5-dimethyl-2,5-bis(tert-butylperoxy) hexane, or cumyl-tert-butyl peroxide. Suitable peroxide compounds are known in the art and are disclosed, for example, in U.S. Patent Application Publication 2018/0105692 at paragraph [0093].

The amount of free radical initiator added to the curable silicone pressure sensitive adhesive composition depends on various factors including the type and amount of initiator selected and the selection of other starting materials, however, starting material I) may be present in an amount of 0.1 to 7 parts by weight, alternatively 0.3 to 6 parts by weight, alternatively 0.5 to 3 parts by weight, per 100 parts by weight of starting material A) and starting material J), if added.

Starting Material J) Hydroxyl-Functional Polydiorganosiloxane

The free radical curable silicone pressure sensitive adhesive composition may optionally further comprise starting material J) a bis-hydroxyl-terminated polydiorganosiloxane with a viscosity of 100 mPa·s to 80,000 mPa·s, alternatively 2,000 mPa·s to 80,000 mPa·s. Viscosity was measured at 25° C. at 0.1 to 50 RPM on a Brookfield DV-III cone & plate viscometer with #CP-52 spindle. Without wishing to be bound by theory, it is thought that starting material J) may be added to: 1) adjust Resin to Polymer Ratio of the curable silicone pressure sensitive adhesive composition to improve adhesion and/or tack performance, 2) to dissolve the pellet and lower the viscosity of curable silicone pressure sensitive adhesive composition to facilitate the coating process in the application, particularly if no solvent is added.

The bis-hydroxyl-terminated polydiorganosiloxane may have formula:

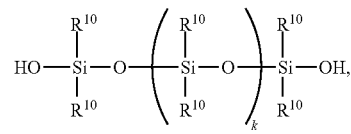

where each $R^{10}$ is an independently selected monovalent hydrocarbon group of 1 to 18 carbon atoms, and subscript k has a value sufficient to give the bis-hydroxyl-terminated polydiorganosiloxane the viscosity described above. Alternatively, viscosity may be 6,000 mPa·s to 80,000 mPa·s, and the value for subscript k is sufficient to give the bis-hydroxyl-terminated polydiorganosiloxane this viscosity.

Alternatively, each $R^{10}$ may be an alkyl group of 1 to 18 carbon atoms, alternatively 1 to 12 carbon atoms, alternatively 1 to 6 carbon atoms, and alternatively 1 to 4 carbon atoms, and starting material (C) may be a bis-hydroxyl-terminated polydialkylsiloxane. Suitable alkyl groups include methyl, ethyl, propyl (including n-propyl and iso-propyl), and butyl (including n-butyl, tert-butyl, sec-butyl, and iso-butyl). Alternatively, each R may be methyl.

Suitable bis-hydroxy-terminated polydiorganosiloxanes may be prepared by methods known in the art such as hydrolysis and condensation of appropriate organohalosilane monomers and/or equilibration of linear and cyclic polyorganosiloxanes. The bis-hydroxy-terminated polydiorganosiloxane may be a bis-OH terminated polydimethylsiloxane, which is commercially available. Bis-OH terminated polydimethylsiloxanes are commercially available from Dow Silicones Corporation of Midland, Michigan, USA.

The hydroxyl-terminated polydiorganosiloxane may be present in the radical curable silicone pressure sensitive adhesive composition in an amount of 10% to 30%, alternatively 15% to 25%, alternatively 17% to 23%, and alternatively 18% to 22%, based on combined weights of all starting materials in the radical curable silicone pressure sensitive adhesive composition.

Method of Making the Radical Curable Silicone Pressure Sensitive Adhesive Composition The radical curable silicone pressure sensitive adhesive composition may be prepared by a process comprising:
1) combining A) the pellet described above and H) the solvent described above, thereby forming a solution; and
2) optionally adding J) the bis-hydroxyl-terminated polydiorganosiloxane. Combining the starting materials in steps 1) and 2) may be performed by mixing via any convenient means, such as mixing the starting materials in a vessel equipped with an agitator. The starting materials may optionally be heated during and/or after step 1) to temperature sufficient to facilitate dissolving the pellets in the solvent, however, temperature should not be high enough to degrade the polydiorganosiloxane gum in the pellet or the bis-hydroxyl-terminated polydiorganosiloxane. Temperature may be from 50° C. to 200° C., alternatively 100° C. to 180° C.

Alternatively, the radical curable silicone pressure sensitive adhesive composition may be prepared by a process comprising:
1) combining A) the pellet and J) the bis-hydroxyl-terminated polydiorganosiloxane, thereby forming a solution; and
2) optionally adding H) the solvent. Combining the starting materials in steps 1) and 2) may be performed by mixing via any convenient means, such as mixing the starting materials in a vessel equipped with an agitator. The starting materials may optionally be heated during and/or after step 1) to temperature sufficient to facilitate dissolving the pellets in the solvent, however, temperature should not be high enough to degrade the polydiorganosiloxane gum in the pellet or the bis-hydroxyl-terminated polydiorganosiloxane. Temperature may be from 50° C. to 200° C., alternatively 100° C. to 180° C.

Methods of Use

The hydrosilylation reaction curable silicone pressure sensitive adhesive composition and/or the radical curable silicone pressure sensitive adhesive composition, each prepared as described above, may be used to form an adhesive article, e.g., a silicone pressure sensitive adhesive (prepared by curing a curable silicone pressure sensitive adhesive composition described above) on a substrate. The method described above may, therefore, further comprise coating the curable silicone pressure sensitive adhesive composition on a surface of a substrate.

Coating the curable silicone pressure sensitive adhesive composition on the surface of the substrate can be performed by any convenient means. For example, the curable silicone pressure sensitive adhesive composition may be coated onto the surface of the substrate by gravure coater, offset coater, offset-gravure coater, roller coater, reverse-roller coater, air-knife coater, or curtain coater.

The substrate can be any material that can withstand the curing conditions (described herein) used to cure the curable silicone pressure sensitive adhesive composition to form the silicone pressure sensitive adhesive on the substrate. For example, any substrate that can withstand heat treatment at a temperature equal to or greater than 150° C. is suitable. Examples of materials suitable for such substrates including plastic films such as polyimide (PI), polyetheretherketone (PEEK), polyethylene naphthalate (PEN), liquid-crystal polyarylate, polyamideimide (PAI), polyether sulfide (PES), or polyethylene terephthalate (PET), or PE (polyethene), or PP (polypropylene). Alternatively, the substrate may be a metal foil such as aluminum foil or copper foil. The thickness of the substrate is not critical, however, the thickness may range from 5 micrometers to 300 micrometers.

To improve bonding of the silicone pressure sensitive adhesive to the substrate, the method may optionally further comprise treating the surface of the substrate before coating the curable silicone pressure sensitive adhesive composition thereon. Treating the substrate may be performed by any convenient means, such as applying a primer, or subjecting the substrate to corona-discharge treatment, etching, or plasma treatment before coating the curable silicone pressure sensitive adhesive composition on the substrate.

An adhesive article such as a film or tape may be prepared by a method comprising coating the curable silicone pressure sensitive adhesive composition described above onto the surface of the substrate described above. When a solvent is present in the curable silicone pressure sensitive adhesive composition, the method may optionally further comprise a drying step, e.g., removing all, or a portion, of the solvent before and/or during curing. Removing solvent may be performed by any convenient means, such as heating at a temperature that vaporizes the solvent without fully curing the curable silicone pressure sensitive adhesive composition, e.g., heating at a temperature of 50° C. to 120° C., alternatively 50° C. to 100° C., and alternatively 70° C. to 80° C. for a time sufficient to remove all or a portion of the solvent (e.g., 30 seconds to 1 hour, alternatively 1 minute to 5 minutes). The method then further comprises curing the curable silicone pressure sensitive adhesive composition at RT or with heating at a temperature of 80° C. to 220° C., alternatively 140° C. to 220° C., alternatively 150° C. to 220° C., alternatively 160° C. to 200° C., and alternatively 165° C. to 180° C. for a time sufficient to cure the curable silicone pressure sensitive adhesive composition (e.g., for 30 seconds to an hour, alternatively 1 minute to 5 minutes). If cure speed needs to be increased or the process curing temperatures lowered, the catalyst level can be increased. This forms a silicone pressure sensitive adhesive on the substrate. Drying and/or curing may be performed by placing the substrate in an oven. The amount of the curable silicone pressure sensitive adhesive composition curable to be applied to the substrate depends on the specific application, however, the amount may be sufficient such that after curing thickness of the silicone pressure sensitive adhesive may be 5 micrometers to 200 micrometers.

The method described herein may optionally further comprise applying a removable release liner to the silicone pressure sensitive adhesive opposite the substrate, e.g., to protect the silicone pressure sensitive adhesive before use of the adhesive article. The release liner may be applied before, during or after curing the curable silicone pressure sensitive adhesive composition; alternatively after curing.

E-Beam Curable Silicone Pressure Sensitive Adhesive Composition

Alternatively, the pellet described above may be used to form an e-beam cured silicone pressure sensitive adhesive. For example, this silicone pressure sensitive adhesive may be prepared by a process comprising:

1) dissolving starting materials comprising A) the pellet described above in one or both of H) the solvent described above and J) the bis-hydroxyl-terminated polydiorganosiloxane described above, thereby forming a solution;

optionally 2) treating a surface of a substrate;

3) coating the solution on the surface of the substrate, 4) removing all or a portion of the solvent, thereby forming a film on the surface of the substrate; and optionally 5) irradiating the film with an e-beam generating apparatus.

Dissolving the pellets may be performed by any convenient means such as placing A) the pellet and H) the solvent and/or J) the bis-hydroxyl-terminated polydiorganosiloxane in a vessel and mixing at RT or elevated temperature, e.g., up to boiling point of the solvent, alternatively 50° C. to 150° C. The amount of pellets and solvent will depend on various factors including the selection of solvent and/or bis-hydroxyl-terminated polydiorganosiloxane, and the coating apparatus and conditions to be used in step 3), however, the amount of solvent may be 50% to 90%, alternatively 60% to 80% based on combined weights of pellets and solvent. The balance may be pellets. Treating the surface of the substrate, coating the solution on the surface of the substrate, and removing all or a portion of the solvent may be performed as described above. Irradiating the film may be performed by any convenient means. E-beam generating apparatus are known in the art, such as a Model 40767 electron beam generating apparatus from PCT of Davenport, IA.

Other optional starting materials may also be added to the curable silicone pressure sensitive adhesive compositions described above. Such optional starting materials include, for example, reactive diluents, fragrances, preservatives and fillers, for example, silica, quartz or chalk.

Alternatively, the curable silicone pressure sensitive adhesive compositions may be free of filler or contain only a limited amount of filler, such as 0 to 30% by weight of the curable silicone pressure sensitive adhesive composition. Fillers can agglomerate or otherwise stick to the coater equipment used to apply the curable silicone pressure sensitive adhesive compositions to substrates. Fillers can also hinder optical properties, for example transparency, of the silicone pressure sensitive adhesive and/or any tape formed therewith.

EXAMPLES

These examples are intended to illustrate the invention to one skilled in the art and are not to be interpreted as limiting the scope of the invention set forth in the claims. The materials in Table 1 were used in these examples.

TABLE 1

Starting Materials

| Starting Material | Description | Commercial Name or Source |
|---|---|---|
| Polyorganosilicate Resin R1 | trimethylsiloxysilicate of unit formula $((CH_3)_3(SiO_{1/2}))_{43}(SiO_{4/2})_{57}$ with silanol content of 2.8% | Dow Silicones Corporation |
| Polyorganosilicate Resin R2 | trimethylsiloxysilicate of unit formula $((CH_3)_3(SiO_{1/2}))_{48}(SiO_{4/2})_{52}$ | Dow Silicones Corporation |
| Polyorganosilicate Resin R3 | trimethylsiloxysilicate of unit formula $((CH_3)_3(SiO_{1/2}))_{50}(SiO_{4/2})_{50}$ | Dow Silicones Corporation |
| Polyorganosilicate Resin R4 | trimethylsiloxysilicate of unit formula $((CH_3)_3(SiO_{1/2}))_{50}(SiO_{4/2})_{51}$ | Dow Silicones Corporation |
| Polyorganosilicate Resin R5 | trimethylsiloxysilicate of unit formula $((CH_3)_3(SiO_{1/2}))_{47}(SiO_{4/2})_{53}$ | Dow Silicones Corporation |
| Gum G1 | dimethylvinylsiloxy-terminated poly(dimethyl/methylvinyl) siloxane of unit formula $M_2^{Vi}D_{5462}D_{7.5}^{Vi}$ | Dow Silicones Corporation |
| Gum G2 | dimethylvinylsiloxy-terminated polydimethyl siloxane of unit formula $M_2^{Vi}D_2^{Vi}D_{5471}$ | Dow Silicones Corporation |
| Gum G3 | bis-dimethylvinylsiloxy-terminated polydimethylsiloxane of unit formula having number average molecular weight of 702,000 g/mol measured by GPC | Dow Silicones Corporation |
| Gum G4 | bis-hydroxyl-terminated polydimethylsiloxane gum with unit formula $M_2^{OH}D_{5836}$ | Dow Silicones Corporation |

Example 1—Apparatus and Procedure for Preparing Pellets

FIG. 1(A) shows an apparatus 110 for preparing pellets (Process A). The apparatus 110 comprised a twin-screw extruder (Leistritz ZSE27 MAXX with L/D=48 and 12 stages) 100 upstream of an underwater pelletizer 108. The twin screw extruder 100 had a barrel 101 with a first feed port 102, a second feed port 103, and an outlet 104 with a die (not shown); heating means (not shown) configured to heat the barrel 101; and a screw mechanism (not shown) housed within the barrel 101. The first feed port 102 was configured to introduce gum into the extruder at the fourth stage 105. The second feed port 103 was configured to introduce polyorganosilicate resin into the fifth stage 106. The screw mechanism was configured to mix and convey the gum and resin from the first feed port 102 and the second feed port 103 to the outlet 104 through the die to form a strand 107, which entered the underwater pelletizer 108. The underwater pelletizer was configured to cool and comminute the strand 107 to form pellets which exited the extruder at exit port 109.

All or a portion of the gum was fed into the extruder 100 through the first feed port 102. All of the resin was fed into the extruder 100 through the second feed port 103. For some samples, where a portion of the gum was added via the first feed port 102, the balance of the gum was added via the second feed port 103 with the resin. The barrel was heated at 200° C. to 250° C. The gum added in the first feed port 102 was fed at 2.5 kg/hr and the resin (optionally including a portion of the gum) added in the second feed port 103 was fed at 7.5 kg/hr. The gum and resin were mixed and conveyed to the outlet 104 through the die (not shown) thereby forming the strand 107. The strand entered the underwater pelletizer 108 and was comminuted into pellets exiting the apparatus 110 at exit port 109. Table 2, below, shows the formulations of gum and resin that formed pellets using this general procedure.

Table 2, below, shows compositions of pellets prepared using the procedure of Reference Example 1. The type of Resin and Gum are as defined in Table 1. Amounts of Resin and Gum are in weight parts.

TABLE 2

Compositions of Pellets

| Composition No. | Type of Resin fed in first feed port | Amount of Resin in first feed port | Type of Gum fed in first feed port | Amount of Gum fed in first feed port | Type of Gum fed in second feed port | Amount of Gum in second feed port |
|---|---|---|---|---|---|---|
| 1 | R1 | 75 | NONE | 0 | G3 | 12.5 |
|  |  |  |  |  | G4 | 12.5 |
| 2 | R2 | 71.25 | G1 | 3.75 | G3 | 12.5 |
|  |  |  |  |  | G4 | 12.5 |
| 3 | R5 | 49.875 | G4 | 3.75 | G3 | 12.5 |
|  | R4 | 21.375 |  |  | G4 | 12.5 |
| 4 | R3 | 16.7325 | G2 | 3.765 | G3 | 12.5 |
|  | R4 | 54.5025 |  |  | G4 | 12.5 |
| 5 | R1 | 35 | G1 | 2 | G4 | 25 |
|  | R2 | 38 |  |  |  |  |
| 6 | R1 | 49 | G1 | 1.3 | G4 | 25 |
|  | R2 | 24.7 |  |  |  |  |
| 7 | R1 | 56 | G1 | 0.95 | G4 | 25 |
|  | R2 | 18.05 |  |  |  |  |
| 8 | R1 | 64 | G1 | 0.55 | G4 | 25 |

Comparative Example 2

Figure 1B:
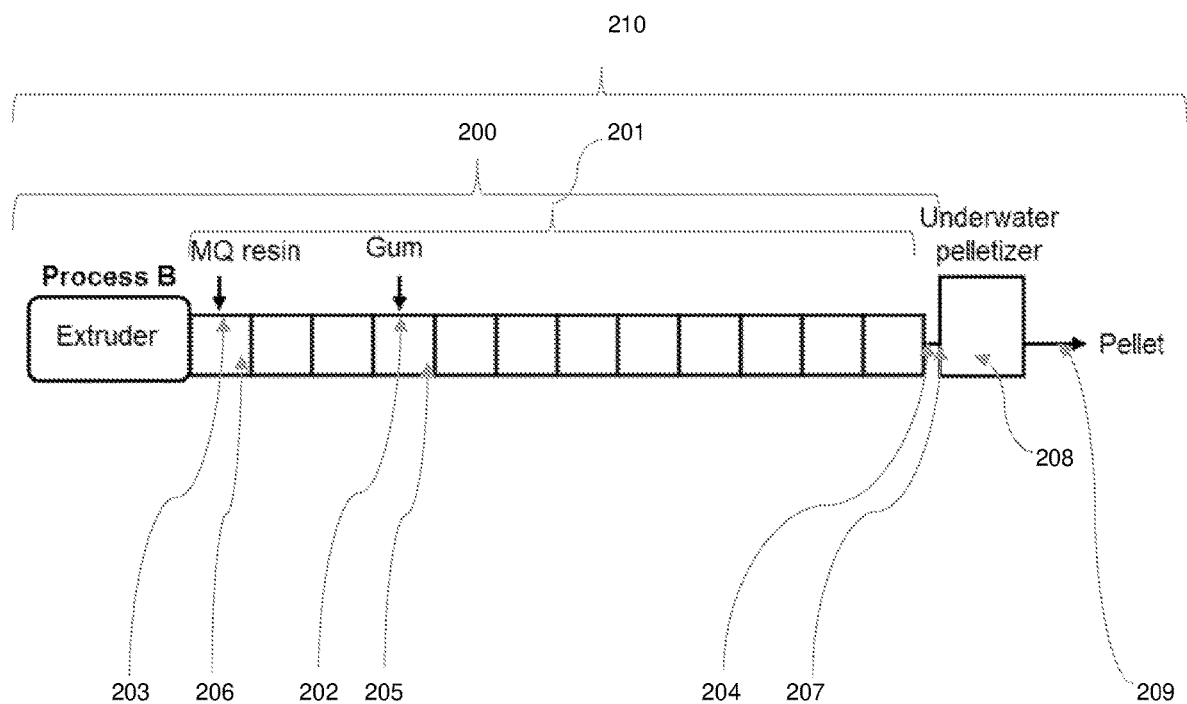
FIG. 1(B) shows a schematic diagram of an apparatus used for preparing pellets according to Comparative Example 2, below.

FIG. 1(B) shows an apparatus 210 for preparing pellets (Process B). The apparatus 210 comprised a twin-screw extruder (Leistritz ZSE27 MAXX with L/D=48 and 12 stages) 200 upstream of an underwater pelletizer 208. The twin screw extruder 200 had a barrel 201 with a first feed port 203, a second feed port 202, and an outlet 204 with a die (not shown); heating means (not shown) configured to heat the barrel 201; and a screw mechanism (not shown) housed within the barrel 201. The first feed port 203 was configured to introduce resin into the extruder at the first stage 206. The second feed port 202 was configured to introduce gum into the fourth stage 205. The screw mechanism was configured to mix and convey the resin and gum from the first feed port 203 and the second feed port 202 to the outlet 204 through the die to form a strand 207, which entered the underwater pelletizer 208. The underwater pelletizer was configured to cool and comminute the strand 207 to form pellets which exited the extruder at exit port 209.

All of the resin was fed into the extruder 200 through the first feed port 203. All of or a portion of the gum was fed into the extruder 200 through the second feed port 202. For some samples, where a portion of the gum was added via the first feed port 203 with the resin, the balance of the gum was added via the second feed port 202. The barrel was heated at 200° C. to 250° C. The gum added in the second feed port 202 was fed at 2.5 kg/hr and the resin (optionally including a portion of the gum) added in the first feed port 203 was fed at 7.5 kg/hr. The gum and resin were mixed and conveyed to the outlet 204 through the die (not shown) thereby forming the strand 207. The strand entered the underwater pelletizer 208 and was comminuted into pellets exiting the apparatus 210 at exit port 209. Composition 1 in Table 2, above was used.

FIG. 2 (A) shows pellets made by the method of Example 1 using Composition No. 1 in Table 2. FIG. 2(B) shows pellets made by the method of Comparative Example 2 using Composition No. 1 in Table 2. Pellets made by the method of Comparative Example 2 were nonuniform in size, shape, and appearance. Without wishing to be bound by theory, it is thought that Example 1 and Comparative Example 2 show that the order of addition (i.e., adding at least 85% of the Gum before adding the Resin) provides a benefit in the method for making pellets herein, i.e., pellets have more uniform size and shape and improved appearance using the claimed method.

Example 3

Figure 1C:
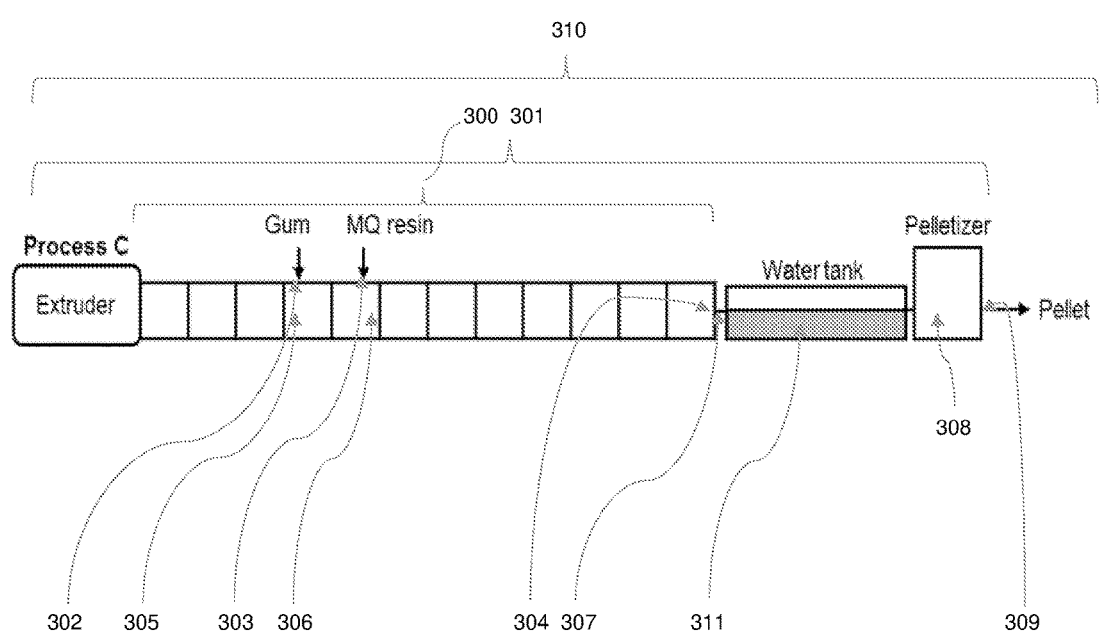
FIG. 1(C) shows a schematic diagram of an alternative apparatus suitable for preparing pellets according to this invention.

FIG. 1(C) shows an apparatus 310 for preparing pellets (Process C). The apparatus 310 comprised a twin-screw extruder (Leistritz ZSE27 MAXX with L/D=48 and 12 stages) 300 upstream of a water tank 311, which was upstream of a pelletizer 308. The twin screw extruder 300 had a barrel 301 with a first feed port 302, a second feed port 303, and an outlet 304 with a die (not shown); heating means (not shown) configured to heat the barrel 301; and a screw mechanism (not shown) housed within the barrel 301. The first feed port 302 was configured to introduce gum into the extruder at the fourth stage 305. The second feed port 303 was configured to introduce polyorganosilicate resin into the fifth stage 306. The screw mechanism was configured to mix and convey the gum and resin from the first feed port 302 and the second feed port 303 to the outlet 304 through the die to form a strand 307, which entered the water tank 311 and thereafter the underwater pelletizer 308. The underwater pelletizer 308 was configured to cool and comminute the strand 307 to form pellets which exited the extruder at exit port 309.

All or a portion of the gum was fed into the extruder 300 through the first feed port 302. All of the resin was fed into the extruder 300 through the second feed port 303. For some samples, where a portion of the gum was added via the first feed port 302, the balance of the gum was added via the second feed port 303 with the resin. The barrel was heated at 200° C. to 250° C. The gum added in the first feed port 302 was fed at 2.5 kg/hr and the resin (optionally including a portion of the gum) added in the second feed port 303 was fed at 7.5 kg/hr. The gum and resin were mixed and conveyed to the outlet 304 through the die (not shown) thereby forming the strand 307. The strand entered the underwater pelletizer 308 and was comminuted into pellets exiting the apparatus 310 at exit port 309. As in Example 1 and Comparative Example 2, Composition 1 from Table 2, above, was used to prepare pellets. Pellets are shown below in FIG. 2(C). Example 3 showed that pellets of acceptable quality can be prepared using the method described herein with different pelletizing equipment provided that the order of addition for Gum and Resin is used.

Pellets prepared according to the method of Example 1 using Composition No. 4 and Composition No. 3 in Table 2, above, were used to make silicone pressure sensitive adhesives.

Reference Example 4—Preparation of Silicone Pressure Sensitive Adhesive Base The starting materials in Table 3 were used to prepare a Silicone Pressure Sensitive Adhesive Base I

TABLE 3

Starting Materials for Silicone Pressure Sensitive Adhesive Base I

| Starting Material | Description | Source | Amount (weight parts) |
|---|---|---|---|
| A1) Pellet | Pellets of Composition No. 4 from Table 2 | See Example 1 above | 44.44 |
| F1) | Tetrakis(vinyldimethylsiloxy) silane | Dow Silicones Corporation | 27.78 |
| D1) | Bis-vinyldimethylsiloxy-terminated polydimethylsiloxane with Mn 11,500 g/mol, DP = 150, and vinyl content of 0.45% | SILASTIC ™ SFD-119 | 27.78 |

Samples were prepared by combining starting materials A1), D1) and F1) in a vessel with mixing. The vessel was heated at 150° C. for two hours. The resulting mixture was cooled to RT and drummed off and stored as a silicone pressure sensitive adhesive base (Silicone Pressure Sensitive Adhesive Base I).

Example 5—Solventless Silicone Pressure Sensitive Adhesive Composition (Hydrosilylation Reaction Curable)

TABLE 4

Starting Materials used to Prepare a Solventless Silicone Pressure Sensitive Adhesive Composition

| Starting Material | Description | Source | Amount (weight parts) |
|---|---|---|---|
| B1) Crosslinker | Trimethylsiloxy-terminated poly (dimethyl, methylhydrogen) siloxane with viscosity of 5 mPa-sec and SiH content of 0.76% | DOWSIL ™ 6-3570 | 5.82 |
| C1) Catalyst | Karstedt's Catalyst | Dow Silicones Corporation | 1.02 |
| G1) ETCH | Ethynyl cyclohexanol | Millipore Sigma of Missouri, St. Louis, USA | .20 |
| E1) 297 | Vinyltriacetoxysilane and Glycidoxypropyltrimethoxysilane | SYL-OFF ™ 297 | 2.12 |

The Silicone Pressure Sensitive Adhesive Base I prepared in Example 4 above was used to make a solventless silicone pressure sensitive adhesive composition as follows. The Silicone Pressure Sensitive Adhesive Base I (50 weight parts) was added to a vessel. Starting material G1) from Table 4 was then added, and the vessel contents were mixed for at least one minute. Starting material B1) from Table 4 was then added, and the vessel contents were mixed for at least 1 minute. Starting material E1) from Table 4 was then added, and the vessel contents were mixed for at least one minute. Starting material C1) from Table 4 was then added, and the vessel contents were mixed for at least one minute.

A four bird bar was used to draw the resulting solventless silicone pressure sensitive adhesive composition down on a surface of a PET substrate. The solventless silicone pressure sensitive adhesive composition was then cured at 140° C. for 2 minutes. The resulting article was cooled to RT and cut into one-inch wide strips. A one-inch strip was applied to a glass panel. Samples were tested the following day by pulling at 180° and 12 inches per minute on a TMI Release and Adhesion Tester. Units are reported in Table 5 below in grams per inch.

TABLE 5

Solventless Silicone Pressure Sensitive Adhesive

| | Example 5 Pt cure |
|---|---|
| R/P ratio | 0.5 |
| SiH/Vi | 4 |
| CT (um) | ~90 |
| Viscosity (mPa · s) | 41,300 |
| Adhesion on Glass (g/inch) | 9.97 |
| Base I (weight parts) | 100 |
| G1) ETCH (weight parts) | 0.2 |
| B1) 6-3570 polymer | 5.82 |
| C1) Catalyst | 1.02 |
| E1) 297 | 2.12 |

In Table 5, Resin/Polymer (R/P) ratio was calculated by dividing weight of the resin present in A1) the pellet by the sum of the weights of: i) the gum present in A1) the pellet, ii) the Bis-vinyldimethylsiloxy-terminated polydimethylsiloxane D1), and iii) the crosslinker B1). The ratio of silicon bonded hydrogen atoms to vinyl groups (SiH/Vi ratio) was calculated by dividing the amount of silicon bonded hydrogen atoms from the crosslinker B1) by combined amounts of vinyl groups from starting materials D1), F1) and the gum in the pellet A1).

Reference Example 6—Preparation of Silicone Pressure Sensitive Adhesive Base II The starting materials in Table 6 were used to prepare a Silicone Pressure Sensitive Adhesive Base II.

TABLE 6

Starting Materials for Silicone Pressure Sensitive Adhesive Base II

| Starting Material | Description | Source | Amount (weight parts) |
|---|---|---|---|
| A2) Pellet | Pellets of Composition No. 3 from Table 2 | See Example 1 above | 58.18 |
| H1) Solvent | Toluene | Alfa Aesar | 20 |
| B2) | Bis-hydroxyl-terminated, polydimethylsiloxane with viscosity 80,000 mPa · s | DOWSIL ™ 3-3602 | 21.82 |

A silicone pressure sensitive adhesive base (Silicone Pressure Sensitive Adhesive Base II) was prepared by adding starting materials A2) and H1) in the amounts shown above in Table 6 in a vessel with mixing until the pellets dissolved in the toluene. Starting material B2) was then added in the amount shown in Table 6, and the vessel contents were then mixed until homogenous to form Silicone Pressure Sensitive Adhesive Base II.

Example 7—Preparation of a Solvent-Borne Silicone Pressure Sensitive Adhesive Composition (Peroxide Curable)

The Silicone Pressure Sensitive Adhesive Base II prepared in Reference Example 6 above was used to make a solvent-borne peroxide curable silicone pressure sensitive adhesive composition. A solution of 10% benzoyl peroxide obtained from Kuhshan Jinshen (in 90% toluene obtained from Alfa Aesar) was used as catalyst. The solution was added in an amount sufficient to provide 2% benzoyl peroxide based on combined weights of starting materials A2) and B2) in Silicone Pressure Sensitive Adhesive Base II.

The resulting solvent-borne silicone pressure sensitive adhesive composition was coated on a surface of a PET substrate using a four bird bar to draw the solvent-borne silicone pressure sensitive adhesive composition down on the surface of the substrate. The resulting coated substrate was heated for 2 minutes at 80° C. (thereby removing solvent) and then for 2 more minutes at 160° C. to cure and form the silicone pressure sensitive adhesive. The resulting article was cooled to RT and cut into one inch wide strips. Each strip was applied to a clean stainless steel substrate. Samples were tested the following day by pulling at 180° and 12 inches per minute on the TMI Release and adhesion tester. Units for adhesion on stainless steel are reported in Table 7 below in grams per inch. Probe tack was also tested. Samples were tested using a PT-1000 Probe Tack Tester the day following coating and panel lamination.

TABLE 7

|  | Example IV |
| --- | --- |
| R/P ratio | 1.2 |
| CT (um) | ~75 |
| Viscosity (mPa · s) | 50,000 |
| Adhesion on Stainless Steel (g/inch) | 1320.1 |
| Probe Tack (g) | 30.7 |
| Base II (weight parts) | 100 |
| BPO (75% solid) (weight parts) | 2.13 |

In Table 7, Resin to Polymer Ratio (R/P ratio) was calculated as: R was the weight of resins in the pellet A2) divided by the combined weights of the gum in pellet A2) and starting material B2).

Definitions and Usage of Terms

Unless otherwise indicated by the context of the specification: all amounts, ratios, and percentages herein are by weight; the articles 'a', 'an', and 'the' each refer to one or more; and the singular includes the plural. The SUMMARY and ABSTRACT are hereby incorporated by reference. The transitional phrases "comprising", "consisting essentially of", and "consisting of" are used as described in the Manual of Patent Examining Procedure Ninth Edition, Revision 08.2017, Last Revised January 2018 at section § 2111.03 I., II., and III. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. DOWSIL™, SILASTIC™ and SYL-OFF™ branded materials are commercially available from Dow Silicones Corporation of Midland, Michigan, USA. The abbreviations used herein have the definitions in Table 8.

TABLE 8

Abbreviations

| Abbreviation | Definition |
| --- | --- |
| ° C. | degrees Celcius |
| CT | coat thickness |
| D unit | a dimethylvinylsiloxy unit of formula $(CH_3)_2SiO_{2/2}$ |
| $D^{Vi}$ unit | a methylvinylsiloxy unit of formula $(CH_3)(CH_2=CH)SiO_{2/2}$ |
| GPC | gel permeation chromatography |
| Mn | number average molecular weight measured by GPC |
| M unit | a trimethylsiloxy unit of formula $(CH_3)_3SiO_{1/2}$ |
| $M^{OH}$ unit | a siloxy unit of formula $(CH_3)_2(HO)SiO_{1/2}$ |
| $M^{Vi}$ unit | a dimethylvinyl siloxy unit of formula $(CH_3)_2(CH_2=CH)SiO_{1/2}$ |
| mPa · s | milli-Pascal seconds |
| NMR | nuclear magentic resonance |
| Q unit | a unit of formula $SiO_{4/2}$ |
| RT | Room temperature of 20° C. to 25° C. |
| um | micrometers |

What is claimed is:

1. A process for preparing solventless polyorganosiloxane pellets comprising:
1) providing an extruder comprising a barrel having a first feed port, a second feed port, and an outlet with a die; heating means configured to heat the barrel; and a screw mechanism housed within the barrel, where the first feed port and the second feed port are configured to introduce starting materials into the extruder, the screw mechanism is capable of mixing and conveying the starting materials from the first feed port and the second feed port to the outlet, the first feed port is upstream of the second feed port, and the second feed port is upstream of the outlet;
2) adding i) at least a portion of a solventless polydiorganosiloxane gum into the extruder through the first feed port, and adding ii) a solventless polyorganosilicate resin into the extruder through the second feed port, wherein said gum and said resin are added in amounts such that a weight ratio resin: gum is 2.1:1 to 3.5:1, wherein the polydiorganosiloxane guy has unit formula $(R^3R^2_2SiO_{1/2})_a(R^2_2SiO_{2/2})_b(R^2SiO_{3/2})_c$, where each $R^2$ is independently selected from the group consisting of an alkyl group of 1 to 18 carbon atoms and an aryl group of 6 to 18 carbon atoms, and each $R^3$ is a curable group, subscript a≥2, subscript b>5000, and subscript c≥0, with the proviso that a quantity (a+b+c) is sufficient to give the gum a number average molecular weight of 500,000 g/mol to 1,000,000 g/mol;
3) mixing the solventless polydiorganosiloxane gum and the solventless polyorganosilicate resin in the barrel and while heating the barrel at a temperature of 200° C. to 250° C., thereby forming a mixture;
4) conveying the mixture through the die at the outlet, thereby forming a strand;
5) cooling the strand exiting the die, and
6) comminuting the strand, thereby preparing the solventless polyorganosiloxane pellets.
2. The process of claim 1, further comprising: preparing a solvent-borne polyorganosilicate resin and devolatilizing the solvent-borne polyorganosilicate resin to form the solventless polyorganosilicate resin before step 2).

3. The process of claim 1, where the solventless polyorganosilicate resin comprises unit formula $(R^1R^2{}_2SiO_{1/2})_w$ $(R^2{}_3SiO_{1/2})_x(SiO_{4/2})_yX_z$, where each $R^2$ is independently selected from the group consisting of an alkyl group of 1 to 18 carbon atoms and an aryl group of 6 to 18 carbon atoms; each $R^1$ is an independently selected alkenyl group of 2 to 18 carbon atoms; X represents a hydrolyzable substituent; subscript w≥0, subscript x>4, subscript y>1, subscript z≥0 with the proviso that a quantity (w+x+y+z) is sufficient to give the resin a weight average molecular weight of 2,000 g/mol to 15,000 g/mole.

4. The process of claim 1, where in unit formula $(R^3R^2{}_2SiO_{1/2})_a(R^2{}_2SiO_{2/2})_b(R^2SiO_{3/2})_c$, each $R^2$ is an independently selected alkyl group of 1 to 6 carbon atoms, and each $R^3$ is independently hydrocarbon group of 2 to 12 carbon atoms, subscript a=2, subscript b is 5,300 to 6,000, and subscript c=0.

5. The process of claim 1, wherein the polydiorganosiloxane gum is a bis-hydroxyl-terminated polydiorganosiloxane of unit formula $[R^2{}_2(HO)SiO_{1/2}]_2(R^2{}_2SiO_{2/2})_d$, where each $R^2$ is as described above; subscript d≥0, subscript, with the proviso that subscript d has a value sufficient to give the polydiorganosiloxane gum the number average molecular weight described above.

6. The process of claim 1, wherein the polydiorganosiloxane gum is a bis-alkenyl-terminated polydiorganosiloxane of unit formula: $(R^2{}_2R^{3'}SiO_{1/2})_2(R^2{}_2SiO_{2/2})_d$, where each $R^2$ is as described above; $R^{3'}$ is an alkenyl group of 2 to 18 carbon atoms, and subscript d≥0, with the proviso that subscript d has a value sufficient to give the polydiorganosiloxane gum the number average molecular weight described above.

7. The process of claim 1, where all of the gum is added in the first feed port.

8. The process of claim 1, where 0 to 15% of the gum is added in the second feed port.

9. The process of claim 1, where steps 4) and 5) are performed using an underwater pelletizer.

10. Solventless polyorganosiloxane pellets prepared by the process of claim 1.

11. A silicone pressure sensitive adhesive composition comprising: A) the solventless polyorganosiloxane pellets of claim 10.

12. The silicone pressure sensitive adhesive composition of claim 11, further comprising:
B) a polyorganohydrogensiloxane,
C) a hydrosilylation reaction catalyst,
D) an aliphatically unsaturated polydiorganosiloxane polymer,
optionally E) an anchorage additive,
optionally F) a branched aliphatically unsaturated polyorganosiloxane polymer,
optionally G) a catalyst inhibitor, and
optionally H) a solvent.

13. The silicone pressure sensitive adhesive composition of claim 11, further comprising:
I) a free radical initiator, and
one or both of H) a solvent and J) a hydroxyl-functional polydiorganosiloxane.

14. A method for preparing an adhesive article comprising:
optionally 1) treating a surface of a substrate,
2) coating the curable silicone pressure sensitive adhesive composition of claim 10 on the surface of the substrate,
optionally 3) removing all or a portion of starting material H) the solvent (if present), and
4) curing the curable silicone pressure sensitive adhesive composition to form a silicone pressure sensitive adhesive.

15. A curable silicone pressure sensitive adhesive composition comprising:
A) the solventless polyorganosiloxane pellets of claim 10,
one or both of H) a solvent and J) a hydroxyl-functional polydiorganosiloxane.

16. A method for preparing a silicone pressure sensitive adhesive comprising:
optionally 1) treating a surface of a substrate,
2) coating the curable silicone pressure sensitive adhesive composition of claim 13, on the surface of the substrate to form a film,
optionally 3) removing all or a portion of starting material H) the solvent (if present), and
4) exposing the film to an electron beam, gamma radiation, or both.

17. A method for preparing an adhesive article comprising:
optionally 1) treating a surface of a substrate,
2) coating the curable silicone pressure sensitive adhesive composition of claim 11 on the surface of the substrate,
optionally 3) removing all or a portion of starting material H) the solvent (if present), and
4) curing the curable silicone pressure sensitive adhesive composition to form a silicone pressure sensitive adhesive.

* * * * *